United States Patent
Ito

(10) Patent No.: US 11,840,228 B2
(45) Date of Patent: Dec. 12, 2023

(54) VEHICLE CONTROL DEVICE

(71) Applicant: DENSO CORPORATION, Kariya (JP)

(72) Inventor: Yutaro Ito, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/876,303

(22) Filed: May 18, 2020

(65) Prior Publication Data

US 2020/0276972 A1   Sep. 3, 2020

Related U.S. Application Data

(63) Continuation of application No. PCT/JP2018/037434, filed on Oct. 5, 2018.

(30) Foreign Application Priority Data

Nov. 17, 2017   (JP) .................................. 2017-221734
Jul. 6, 2018    (JP) .................................. 2018-129289

(51) Int. Cl.
*B60W 30/14* (2006.01)
*B60W 30/16* (2020.01)
*B60W 30/18* (2012.01)

(52) U.S. Cl.
CPC .......... *B60W 30/146* (2013.01); *B60W 30/16* (2013.01); *B60W 30/18072* (2013.01); *B60W 2510/10* (2013.01); *B60W 2510/18* (2013.01); *B60W 2530/00* (2013.01);
(Continued)

(58) Field of Classification Search
CPC ..... B60W 30/14; B60W 30/146; B60W 30/16
See application file for complete search history.

(56) References Cited

U.S. PATENT DOCUMENTS

| 2012/0083987 A1* | 4/2012 | Schwindt ............ B60W 30/16 701/96 |
| 2015/0183433 A1* | 7/2015 | Suzuki .................. B60W 10/06 701/96 |
| 2015/0266473 A1 | 9/2015 | Hayasaka |

(Continued)

FOREIGN PATENT DOCUMENTS

| JP | 2007-291919 A | 11/2007 |
| JP | 2010-158924 A | 7/2010 |

(Continued)

OTHER PUBLICATIONS

Dec. 25, 2018 International Search Report issued in International Patent Application No. PCT/JP2018/037434.

*Primary Examiner* — Imran K Mustafa
(74) *Attorney, Agent, or Firm* — Oliff PLC

(57) ABSTRACT

A vehicle control device executes a traveling control that controls traveling of an own vehicle to enable the own vehicle to follow a preceding vehicle traveling in front of the own vehicle. The vehicle control device includes: an environment prediction unit that predicts whether an adverse-effect change has occurred in a surrounding environment around the own vehicle, the adverse-effect change being likely to have an adverse effect on a fuel economy of the own vehicle; and an acceleration control unit configured to execute a prediction control that enables an acceleration of the own vehicle to be limited when the environment prediction unit predicts that the adverse-effect change has occurred in the surrounding environment.

21 Claims, 19 Drawing Sheets

(52) U.S. Cl.
CPC ..... *B60W 2552/05* (2020.02); *B60W 2555/00* (2020.02); *B60W 2555/60* (2020.02)

(56) References Cited

U.S. PATENT DOCUMENTS

| | | | | |
|---|---|---|---|---|
| 2015/0314771 | A1* | 11/2015 | Dextreit | B60K 6/48 |
| | | | | 180/65.265 |
| 2017/0226947 | A1* | 8/2017 | Kawakami | B60W 30/18072 |
| 2018/0003143 | A1* | 1/2018 | Khafagy | B60L 50/10 |
| 2018/0111618 | A1 | 4/2018 | Morimoto et al. | |
| 2018/0370523 | A1* | 12/2018 | Geller | B60W 30/16 |

FOREIGN PATENT DOCUMENTS

| | | |
|---|---|---|
| JP | 2011-163535 A | 8/2011 |
| JP | 2016-079934 A | 5/2016 |
| JP | 2017-207920 A | 11/2017 |

\* cited by examiner

VEHICLE CONTROL DEVICE

CROSS-REFERENCE TO RELATED APPLICATION

The present application is a continuation application of International Application No. PCT/JP2018/037434, filed on Oct. 5, 2018, which claims priority to Japanese Patent Application No. 2017-221734 filed on Nov. 17, 2017 and No. 2018-129289 filed on Jul. 6, 2018. The contents of these applications are incorporated herein by reference in their entirety.

BACKGROUND

Technical Field

The present disclosure relates to a vehicle control device.

Background Art

There is a conventional vehicle control device described below. The vehicle control device sets the minimum inter-vehicle distance according to the velocity of the own device, and stops motive power sources such as the engine and the motor to coast the own vehicle when the inter-vehicle distance between the own vehicle and a preceding vehicle traveling in front of the own vehicle becomes shorter than the minimum inter-vehicle distance. The vehicle control device sets the maximum inter-vehicle distance according to the velocity of the own device, and starts to drive the motive power sources when the inter-vehicle distance becomes longer than the maximum inter-vehicle distance during coasting.

SUMMARY

In the present disclosure, provided is a vehicle control device as the following. The vehicle control device includes: an environment prediction unit that predicts whether an adverse-effect change has occurred in a surrounding environment around an own vehicle, the adverse-effect change being likely to have an adverse effect on a fuel economy of the own vehicle; and an acceleration control unit configured to execute a prediction control that enables an acceleration of the own vehicle to be limited when the environment prediction unit predicts that the adverse-effect change has occurred in the surrounding environment.

DETAILED DESCRIPTION OF THE PREFERRED EMBODIMENTS

[PTL 1] JP 2007-291919 A

Figure 1:
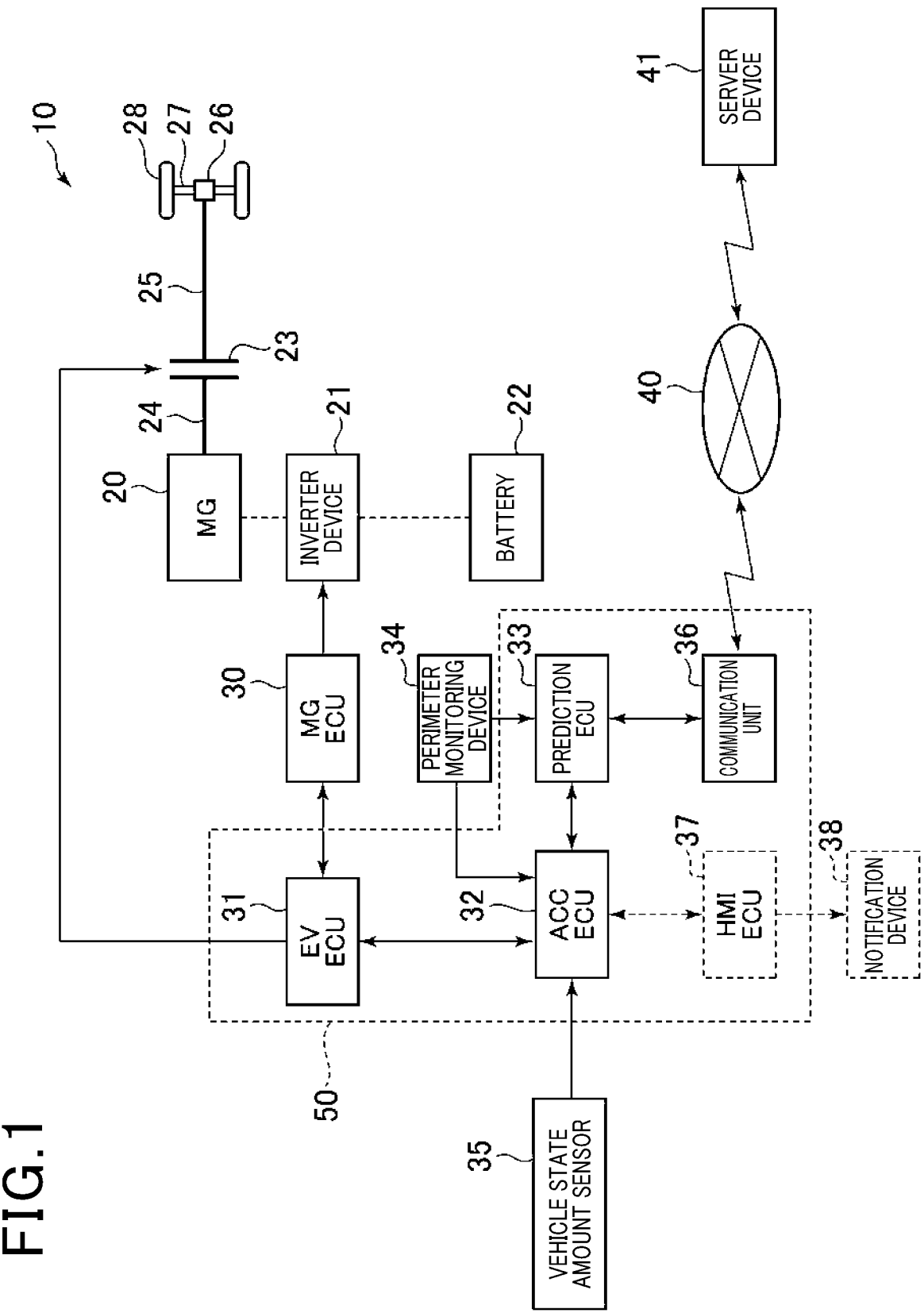
FIG. 1 is a block diagram showing a schematic configuration of a vehicle in a first embodiment.

In PTL 1 listed above, when the preceding vehicle suddenly decelerates or another vehicle cuts into the lane from an adjacent lane, in order to secure a vehicle-to-vehicle distance from the preceding vehicle, a deceleration control by braking or the stop of the engine immediately after starting due to limitation of acceleration, may be unavoidable. Accordingly, energy loss occurs when the deceleration control is performed by braking. The stop of the engine immediately after starting leads to decrease of engine efficiency. Thus, the deceleration control by braking or the stop of the engine immediately after starting may cause impairment of fuel economy.

On the other hand, this problem may be handled by taking countermeasures such as keeping a longer inter-vehicle distance from the preceding vehicle and traveling the own vehicle with a limitation on acceleration. However, these countermeasures would deteriorate the performance of following the preceding vehicle and cause the driver a feeling of discomfort.

PTL 1 does not mention any countermeasures against these problems in relation to the vehicle control device.

An object of the present disclosure is to provide a vehicle control device that achieves improvement in fuel economy while ensuring the performance of following a preceding vehicle.

A vehicle control device in an aspect of the present disclosure executes a traveling control that controls traveling of an own vehicle to enable the own vehicle to follow a preceding vehicle traveling in front of the own vehicle. The vehicle control device includes: an environment prediction unit that predicts whether an adverse-effect change has occurred in a surrounding environment around the own vehicle, the adverse-effect change being likely to have an adverse effect on a fuel economy of the own vehicle; and an acceleration control unit configured to execute a prediction control that enables an acceleration of the own vehicle to be limited when the environment prediction unit predicts that the adverse-effect change has occurred in the surrounding environment.

According to this configuration, if an adverse-effect change has occurred in the surrounding environment around the own vehicle, the adverse-effect change being likely to have an adverse effect on a fuel economy of the own vehicle, the acceleration of the own vehicle is limited in advance. Thus, it is possible to avoid a situation in which the own vehicle actually becomes impaired in fuel economy. This leads to improvement in fuel economy of the own vehicle.

Hereinafter, embodiments of a vehicle control device will be described with reference to the drawings. For the ease of comprehension, identical constituent elements shown in the drawings are given identical reference signs as much as possible and duplicated description thereof will be omitted.

First Embodiment

First, a schematic configuration of a vehicle equipped with a vehicle control device in a first embodiment will be described.

As illustrated in FIG. 1, a vehicle 10 is an electric automobile that runs under motive power of a motor generator 20. The vehicle 10 includes the motor generator 20, an inverter device 21, a battery 22, and a clutch 23.

The battery 22 is formed of a secondary battery such as a lithium-ion battery that is capable of charging and discharging. The inverter device 21 converts direct-current power charged in the battery 22 into alternating-current power, and supplies the converted alternating-current power to the motor generator 20. The motor generator 20 is driven under the alternating-current power supplied from the inverter device 21 and rotates a first motive power transmission shaft 24. The first motive power transmission shaft 24 is coupled to a second motive power transmission shaft 25 with the clutch 23. The clutch 23 is switchable between a connection state in which the first motive power transmission shaft 24 and the second motive power transmission shaft 25 are coupled to allow transfer of motive power between these two shafts and a non-connection state in which the first motive power transmission shaft 24 and the second motive power transmission shaft 25 are decoupled to shut off the transfer of motive power between these two shafts. When the clutch 23 is in the connection state, the motive power transferred from the motor generator 20 to the first motive power transmission shaft 24 is then transferred to a wheel 28 of the vehicle 10 via the second motive power transmission shaft 25, a differential gear 26, and a drive shaft 27. Accordingly, the vehicle 10 starts to run. In this manner, in the present embodiment, the motor generator 20 corresponds to a power train.

The motor generator 20 performs regenerative power generation at the time of braking of the vehicle 10. That is, the braking force acting on the wheel 28 at the time of braking of the vehicle 10 is input into the motor generator 20 via the drive shaft 27, the differential gear 26, the second motive power transmission shaft 25, the clutch 23, and the first motive power transmission shaft 24. The motor generator 20 generates electric power under the motive power input from the wheel 28. The electric power generated by the motor generator 20 is converted by the inverter device 21 from alternating-current power into direct-current power and is charged into the battery 22.

The vehicle 10 further includes a motor generator (MG) electronic control unit (ECU) 30, an electric vehicle (EV) ECU 31, an adaptive cruise control (ACC) ECU 32, a prediction ECU 33, a perimeter monitoring device 34, and a vehicle state amount sensor 35. The ECUs 30 to 33 are formed mainly of a microcalculater having a CPU and storage devices such as a ROM and a RAM, and perform various controls by executing programs stored in advance in the storage devices.

The vehicle state amount sensor 35 detects various state amounts of the vehicle 10. The various state amounts detected by the vehicle state amount sensor 35 include information on the velocity and acceleration and the like of the vehicle 10.

The perimeter monitoring device 34 includes a camera, a millimeter radar device, a laser radar device, or the like. The perimeter monitoring device 34 detects surrounding vehicles that are traveling around the own vehicle 10, and calculates various state amounts of the surrounding vehicles. The surrounding vehicles include a preceding vehicle that is traveling in front of the own vehicle 10 in the lane in which the own vehicle 10 is traveling and adjacent vehicles that are traveling in lanes adjacent to the lane in which the own vehicle 10 is traveling. The state amounts detected by the perimeter monitoring device 34 include relative positions, relative distances, relative velocities, relative accelerations, and others of the surrounding vehicles to the own vehicle 10. The relative distance of a surrounding vehicle corresponds to an inter-vehicle distance. The relative position of a surrounding vehicle to the own vehicle 10 is defined as a position in a biaxial coordinate system using the lateral axis of the own vehicle 10 and the longitudinal axis of the vehicle 10, for example. In the present embodiment, the perimeter monitoring device 34 corresponds to a perimeter monitoring unit.

The MG ECU 30 controls operations of the motor generator 20 by driving the inverter device 21 under a command from the EV ECU 31. For example, the EV ECU 31 transmits a motive power command value as a command value of output motive power of the motor generator 20 to the MG ECU 30. Upon receipt of the motive power command value from the EV ECU 31, the MG ECU 30 controls driving of the inverter device 21 such that the motor generator 20 outputs the motive power corresponding to the motive power command value. When the vehicle 10 is being braked, the MG ECU 30 drives the inverter device 21 such that electric power generated by regenerative power generation of the motor generator 20 is charged into the battery 22.

The EV ECU 31 implements traveling of the vehicle 10 in accordance with the driver driving requests by calculating a motive power command value necessary for implementation of traveling in accordance with the driver driving requests and transmitting the calculated motive power command value to the MG ECU 30. The EV ECU 31 exchanges necessary information for various controls with the ACC ECU 32 and calculates a motive power command value in accordance with the request from the ACC ECU 32. For example, upon receipt of an acceleration command value as a command value of acceleration of the vehicle 10 from the ACC ECU 32, the EV ECU 31 calculates the motive power command value corresponding to the acceleration command value and transmits the calculated motive power command value to the MG ECU 30, thereby to accelerate the vehicle 10 with the acceleration in accordance with the acceleration command value. The EV ECU 31 turns the clutch 23 to the connection or non-connection state in accordance with the request from the ACC ECU 32, for example. In the present embodiment, the EV ECU 31 corresponds to a traveling control unit.

When an occupant operates an operation unit provided in the vehicle 10, for example, the ACC ECU 32 executes traveling controls of the vehicle. As the traveling controls, the ACC ECU 32 executes a cruise control (CC) to control the traveling of the vehicle 10 such that the vehicle 10 runs at a constant velocity and an adaptive cruise control (ACC) to control the traveling of the vehicle 10 such that the vehicle 10 follows the preceding vehicle traveling in front of the own vehicle 10. In the present embodiment, the ACC control corresponds to a velocity control by which to control acceleration and deceleration of the own vehicle 10 such that the own vehicle 10 follows the preceding vehicle. In the present embodiment, the ACC ECU 32 corresponds to an acceleration control unit.

Figure 2:
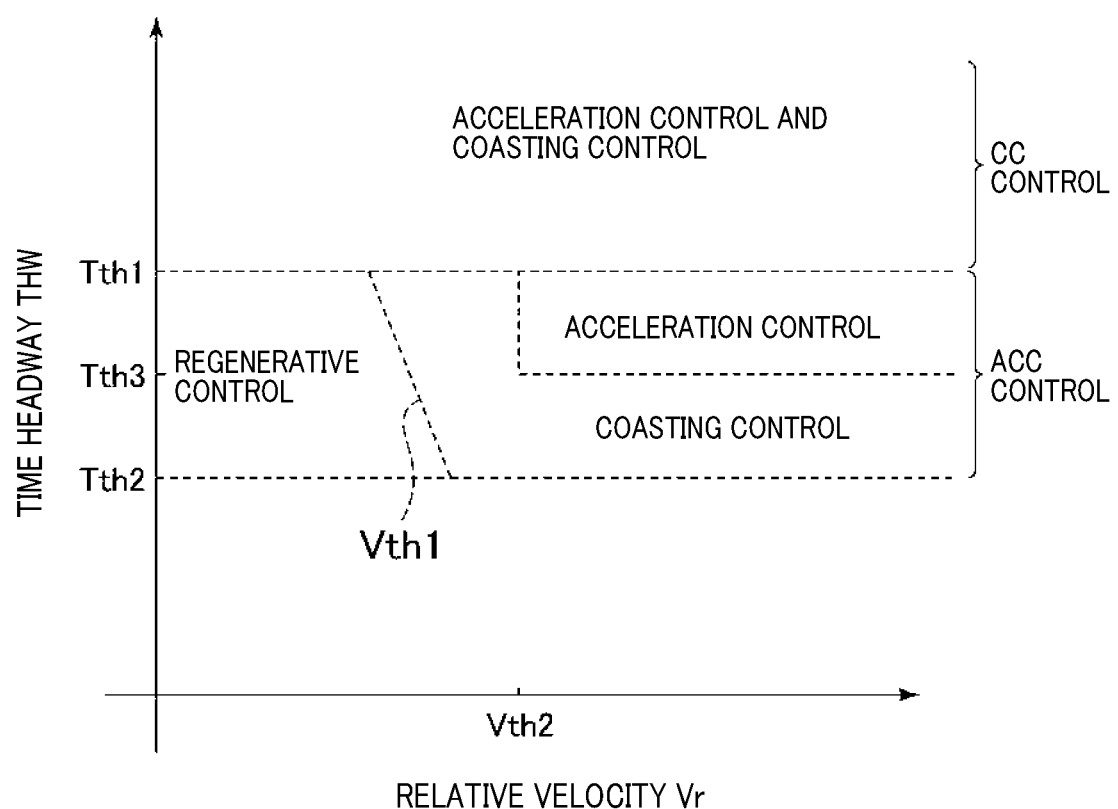
FIG. 2 is a graph showing an example of a method of vehicle control by an ACC ECU in the first embodiment.

Specifically, the ACC ECU 32 calculates a time headway THW that is a time until the vehicle 10 reaches the preceding vehicle, based on the relative velocity and relative distance of the preceding vehicle to the vehicle 10. As illustrated in FIG. 2, when the time headway THW is equal to or greater than a predetermined first time threshold Tth1, that is, when there is a temporal leeway for the vehicle 10 to reach the preceding vehicle, the ACC ECU 32 executes the CC control. As the CC control, the ACC ECU 32 repeatedly accelerates and decelerates the vehicle 10. At that time, the ACC ECU 32 controls the acceleration and deceleration of the vehicle 10 such that the average velocity of the vehicle 10 reaches a velocity Vset set by the occupant through the operation unit.

Figure 3:
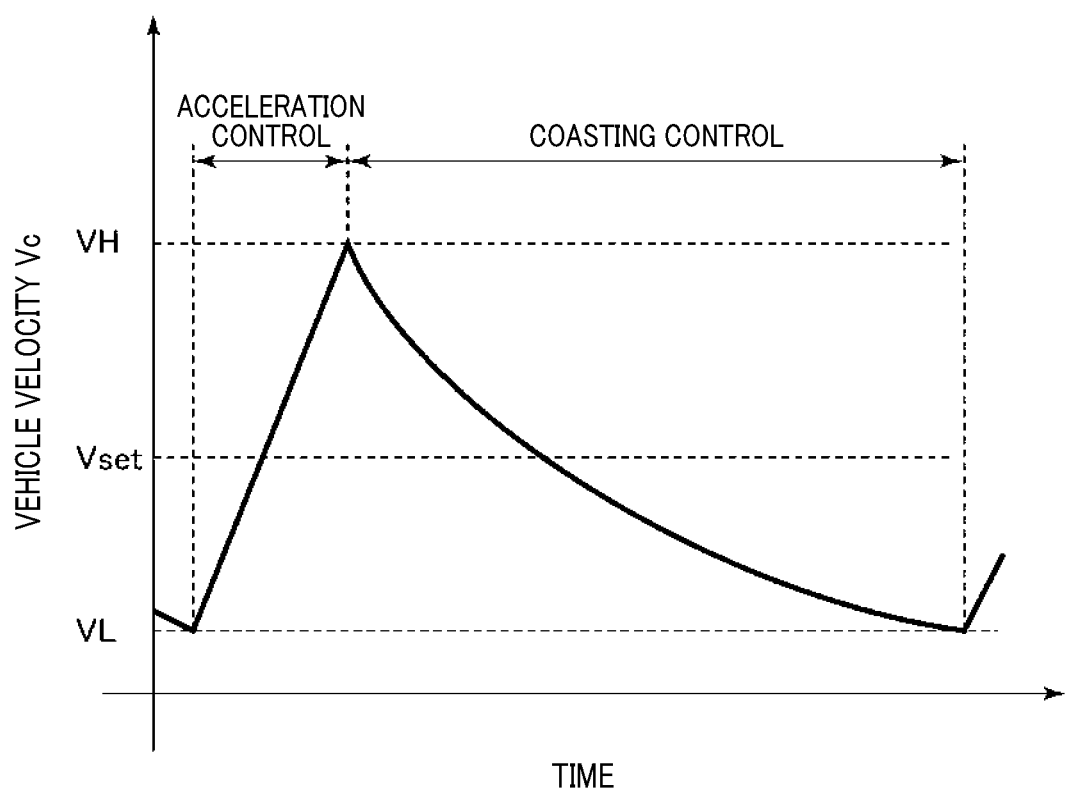
FIG. 3 is a graph showing an example of a method of vehicle control by the ACC ECU in the first embodiment.

Specifically, the ACC ECU 32 sets a lower limit velocity VL lower than the set velocity Vset and an upper limit velocity VH higher than the set velocity as shown in FIG. 3, based on the set speed Vset of the occupant. When the velocity Vc of the vehicle 10 reaches the lower limit velocity VL by decelerating the vehicle 10, the ACC ECU 32 executes an acceleration control to accelerate the vehicle 10. As the acceleration control, the ACC ECU 32 transmits a preset positive acceleration command value to the EV ECU 31. Accordingly, the EV ECU 31 calculates a positive motive power command value corresponding to the acceleration command value and transmits this motive power command value to the MG ECU 30, whereby the vehicle 10 accelerates at predetermined acceleration.

When the vehicle velocity Vc reaches the upper limit velocity VH during acceleration of the vehicle 10, the ACC ECU 32 executes a coasting control to coast the vehicle 10 such that the vehicle 10 decelerates. As the coasting control, the ACC ECU 32 transmits an acceleration command value of zero to the EV ECU 31 and transmits a command for bringing the clutch 23 into the non-connection state to the EV ECU 31. Accordingly, the EV ECU 31 transmits the motive power command value of zero to the MG ECU 30 and brings the clutch 23 into the non-connection state. As a result, the driving of the motor generator 20 is stopped and the vehicle 10 starts to coast and thus naturally decelerates. After that, when the velocity Vc of the vehicle 10 reaches the lower limit velocity VL, the ACC ECU 32 transmits a command for bringing the clutch 23 into the connection state to the EV ECU 31 and executes again the acceleration control described above.

On the other hand, as illustrated in FIG. 2, when the time headway THW is equal to or longer than a second time threshold Th2 and is shorter than the first time threshold Tth1, the ACC ECU 32 executes the ACC control. As the ACC control, the ACC ECU 32 executes a burn-and-coast control to repeatedly accelerate and decelerate the vehicle 10 such that the own vehicle 10 runs following the preceding vehicle.

Specifically, when the relative velocity Vr of the preceding vehicle is lower than the predetermined first velocity threshold Vth1, that is, when the own vehicle 10 is rapidly approaching the preceding vehicle, the ACC ECU 32 performs regenerative control. As the regenerative control, the ACC ECU 32 transmits a negative acceleration command value to the EV ECU 31. Accordingly, the EV ECU 31 calculates a negative motive power command value corresponding to the acceleration command value, and transmits this motive power command value to the MG ECU 30, whereby the motor generator 20 performs regenerative power generation. When the motor generator 20 performs regenerative power generation, a braking force is applied to the wheel 28 of the vehicle 10 by regenerative energy thereof. Thus, the vehicle 10 can be decelerated more quickly than in the case where the vehicle 10 is caused to coast. This widens the inter-vehicle distance between the vehicle 10 and the preceding vehicle.

The ACC ECU 32 has a second velocity threshold Vth2 greater than the first velocity threshold Vth1. When the relative velocity Vr of the preceding velocity is within a range of the first velocity threshold Vth1 to the second velocity threshold Vth2, the ACC ECU 32 executes the coasting control described above. The ACC ECU 32 also has a third time threshold Tth3 that is set between the first time threshold Tth1 and the second time threshold Tth2. Accordingly, even when the relative velocity Vr of the preceding vehicle is equal to or higher than the second velocity threshold Vth2 and the time headway THW is a value which is within a range of the second time threshold Tth2 to the third time threshold Tth3, the ACC ECU 32 executes the coasting control. This coasting control makes it possible to widen the inter-vehicle distance between the vehicle 10 and the preceding vehicle.

When the relative velocity Vr of the preceding vehicle is equal to or higher than the second velocity threshold Vth2 and the time headway THW is a value which is within a range of the third time threshold Tth3 to the first time threshold Tth1, the ACC ECU 32 executes the acceleration control described above.

In this manner, the ACC ECU 32 selectively executes the regenerative control, the coasting control, and the acceleration control according to the time headway THW and the relative velocity Vr of the preceding vehicle, whereby the own vehicle 10 follows the preceding vehicle.

If the preceding vehicle suddenly decelerates while the ACC ECU 32 executes the acceleration control as the CC control or the ACC control, the time headway THW and the relative velocity Vr may sharply decrease. Accordingly, when the ACC ECU 32 executes the regenerative control to generate a braking force on the wheel 28, part of the kinetic energy of the vehicle 10 can be recovered as electric energy in the battery 22 by the regenerative control. However, the remaining kinetic energy is converted into thermal energy during generation of the braking force on the wheel 28 and dissipated into the atmosphere, and thus cannot be recovered. This causes inevitable energy loss. Energy loss occurs also when the kinetic energy of the vehicle 10 is converted into electric energy. This energy loss may impair the fuel economy of the vehicle 10.

Thus, in the vehicle 10 of the present embodiment, the prediction ECU 33 predicts whether an adverse-effect change has occurred in the surrounding environment around the own vehicle, the adverse-effect change being likely to have an adverse effect on sharp decelerating of the preceding vehicle, that is, on a fuel economy of the own vehicle. In the present embodiment, the prediction ECU 33 corresponds to an environment prediction unit. When the prediction ECU 33 predicts that an adverse-effect change has occurred in a surrounding environment around the own vehicle, the adverse-effect change being likely to have an adverse effect on a fuel economy of the own vehicle 10, the ACC ECU 32 executes a prediction control to limit in advance the acceleration of the own vehicle 10 before the execution of the regenerative control as the ACC control.

As illustrated in FIG. 1, the prediction ECU 33 is capable of wirelessly connecting to a network line 40 via a communication unit 36 installed in the vehicle 10. The prediction ECU 33 performs various kinds of communication with a server device 41 via the network line 40. The server device 41 acquires various state amounts from a plurality of vehicles and makes a database of those state amounts. The server device 41 creates various traveling models based on the plurality of the state amounts of vehicles in the database. The prediction ECU 33 can predict the traveling paths of the surrounding vehicles by the use of the traveling models created by the server device 41. In the present embodiment, the ACC ECU 32, the prediction ECU 33, and the communication unit 36 constitute a vehicle control device 50.

The prediction ECU 33 is arranged independently of the ECUs controlling the components because the prediction ECU 33 requires high-speed processing and connections with the plurality of ECUs.

Next, a procedure of a prediction control executed by the ACC ECU 32 and the prediction ECU 33 will be specifically described with reference to FIG. 4. The ACC ECU 32 and the prediction ECU 33 repeatedly execute the process shown in FIG. 4 in predetermined cycles.

Figure 4:
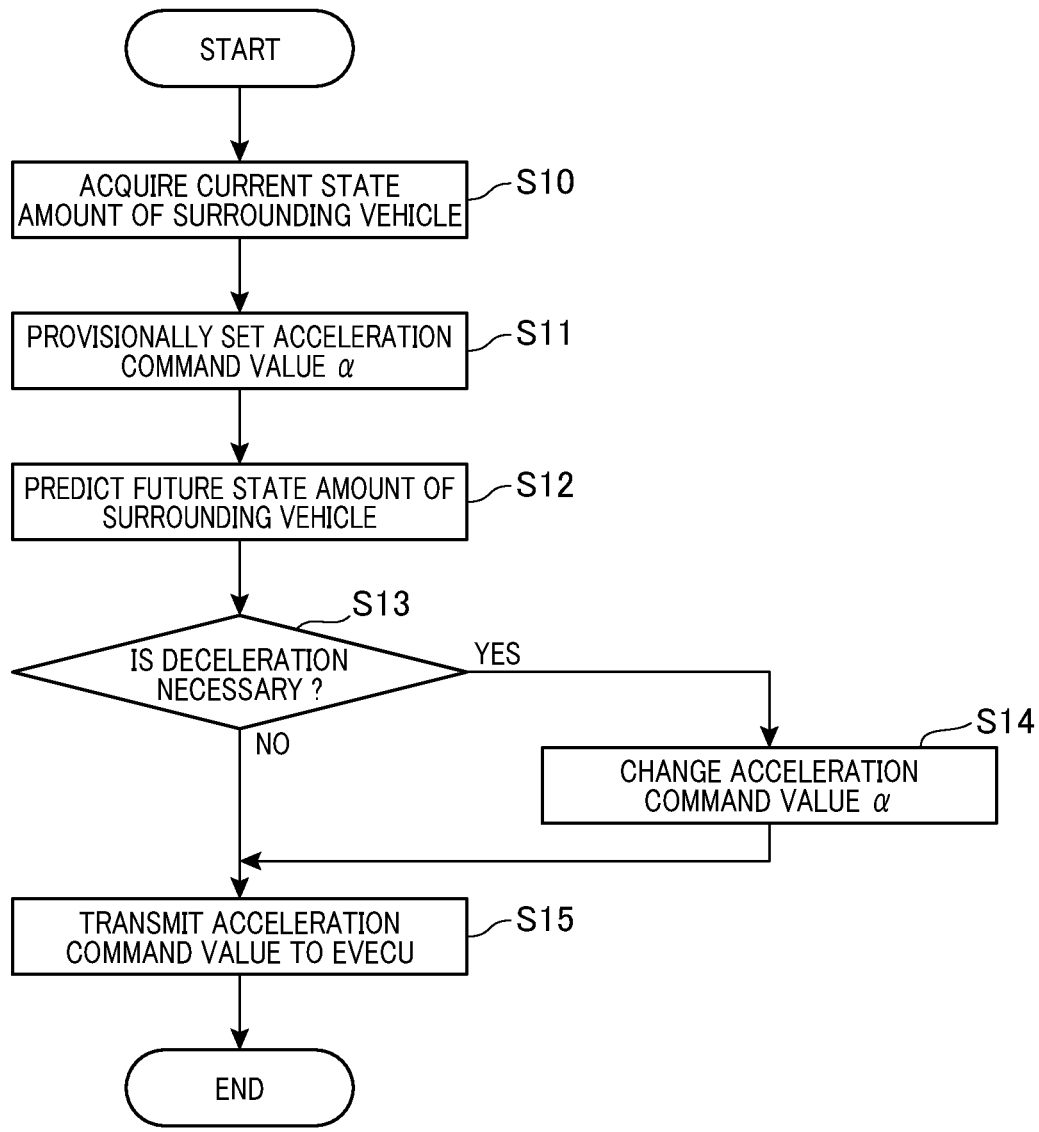
FIG. 4 is a flowchart showing a procedure of processing executed by the ACC ECU and a prediction ECU in the first embodiment.

As illustrated in FIG. 4, in step S10, the prediction ECU 33 first acquires the current state amounts of the surrounding vehicles from the perimeter monitoring device 34. The information acquired by the prediction ECU 33 from the perimeter monitoring device 34 includes the relative distances, relative velocities, and relative accelerations of the surrounding vehicles.

Subsequent to step S10, in step S11, the ACC ECU 32 provisionally sets an acceleration command value α to be transmitted to the EV ECU 31. Specifically, out of the information acquired from the perimeter monitoring device 34 in step S10, the ACC ECU 32 uses the relative velocity and relative distance of the preceding vehicle to calculate time headway, and executes the control shown in FIG. 2 based on the calculated time headway and the relative velocity to calculate a first set value α1 of the acceleration command value α. The ACC ECU 32 provisionally sets the acceleration command value α to the first set value α1.

Subsequent to step S11, in step S12, the prediction ECU 33 predicts the future state amounts of the surrounding vehicles including the preceding vehicle and the adjacent vehicles. The predicted state amounts of the surrounding vehicles include time-series data on the future relative positions, relative distances, relative velocities, and relative accelerations of the surrounding vehicles. Specifically, the prediction ECU 33 predicts the future state amounts from the present to a predetermined time later by the use of calculating equations and models from the current and past values of the state amounts of the surrounding vehicles. Accordingly, the prediction ECU 33 can predict behaviors of the surrounding vehicles from the present to a predetermined time later.

The prediction processing in step S12 is not limited to be executed based on the current and past values of the state amounts of the surrounding vehicles, it may be executed based on other information on the state amounts of the surrounding vehicles. This prediction may be performed in time-series wave form in which the behaviors of the surrounding vehicles are expressed in predetermined probability models based on the past vehicle traveling data, or may be performed by statistically processing the traveling data of vehicles having run through a spot in the past where the own vehicle is currently traveling to calculate the capabilities of deceleration and cut-in by vehicles at a certain spot.

The prediction time is set to a time in which a vehicle can reach a full speed that is allowed as a traveling speed at an acceleration under normal traveling conditions. For example, the range of acceleration can be set to −1 G to 1 G, and the full speed can be set to be in the range from 0 km/h to a legal limit vehicle speed.

Subsequent to step S12, in step S13, the prediction ECU 33 determines whether the vehicle 10 needs deceleration based on the behaviors of the surrounding vehicles. This determination processing is specifically performed by the method described below.

Suppose that, when there exist N surrounding vehicles, the own vehicle 10 runs with a predetermined state amount $b(t)$ with respect to the traveling of an i-th surrounding vehicle where the value i is defined as an integer within a range of $1 \leq i \leq N$. The state amount $b(t)$ is a function of acceleration with time t as a variable, for example. When the own vehicle 10 runs with the state amount $b(t)$, the braking energy generated in the own vehicle 10 can be expressed as $E_{brk\ i}(b(t))$. The value $E_{brk\ i}(b(t))$ is a predicted value of braking energy that will be generated when the own vehicle 10 is decelerated by execution of the ACC control during a period of time from the present to a predetermined time later.

Figure 5:
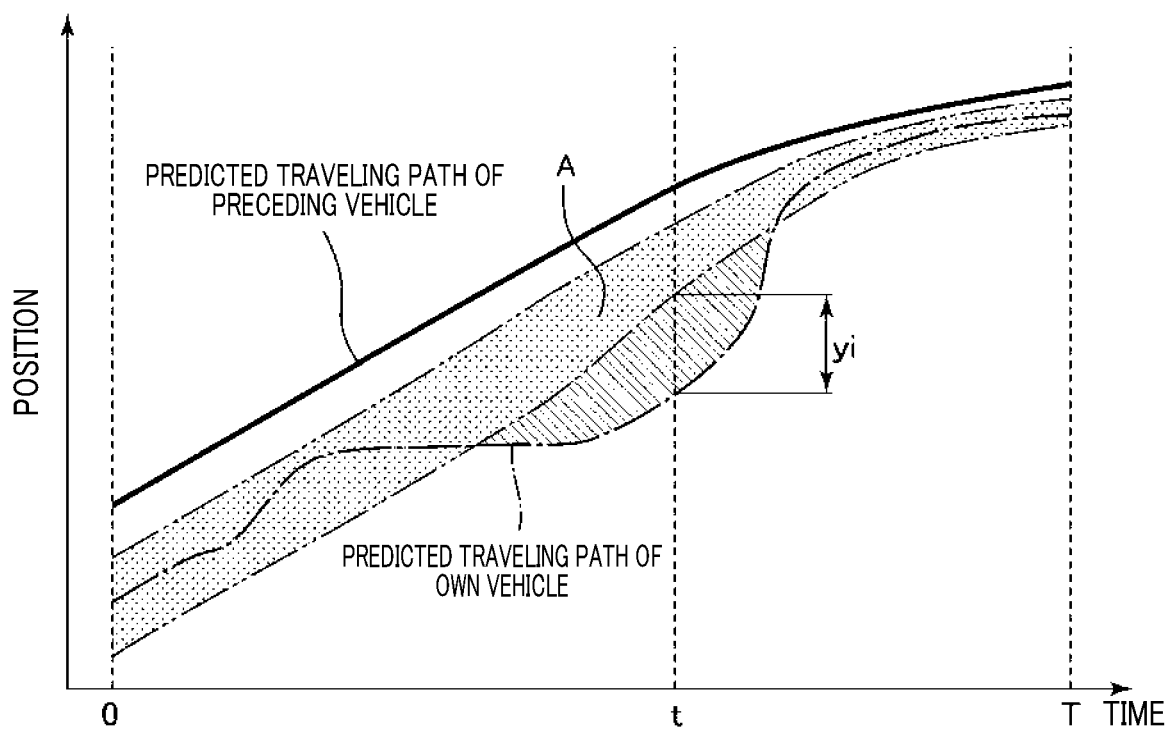
FIG. 5 is a graph showing an example of a method for calculating a deviation amount of an own vehicle from an ideal traveling range predicted by the prediction ECU in the first embodiment.

The following performance of the own vehicle 10 to the i-th surrounding vehicle can be evaluated as shown in FIG. 5 by a deviation amount $y_i$ of the predicted position of the own vehicle 10 from an ideal traveling range A during a period of time from the present to a predetermined time later, where the ideal traveling range A is set to a range of ideal inter-vehicle distance in execution of the ACC control under the own vehicle 10 follows the preceding vehicle. The ideal traveling range A is set with respect to the predicted traveling position of the i-th surrounding vehicle shown by a dashed-dotted line and can be obtained by a calculating equation or the like from the predicted traveling position of the surrounding vehicle. A following performance evaluation value $C_i(b(t))$ of the own vehicle 10 can be obtained using the deviation amount $y_i$ of predicted position of the own vehicle 10 from the ideal traveling range A by the following formula f1 where T represents prediction time:

[Math. 1]

$$C_i(b(t)) = \int_0^T y_i(b(t)) dt \quad (f1)$$

From the foregoing, an expected value $E_{brk}(b(t))$ of braking energy of the own vehicle with respect to the N surrounding vehicles and an expected value $C(b(t))$ of the following performance evaluation value can be defined by the following formulas f2 and f3:

[Math. 2]

$$E_{brk}(b(t)) = \sum_{i=1}^{N} p_i E_{brk\ i}(b(t)) \quad (f2)$$

$$C(b(t)) = \sum_{i=1}^{N} p_i C_i(b(t)) \quad (f3)$$

Figure 6:
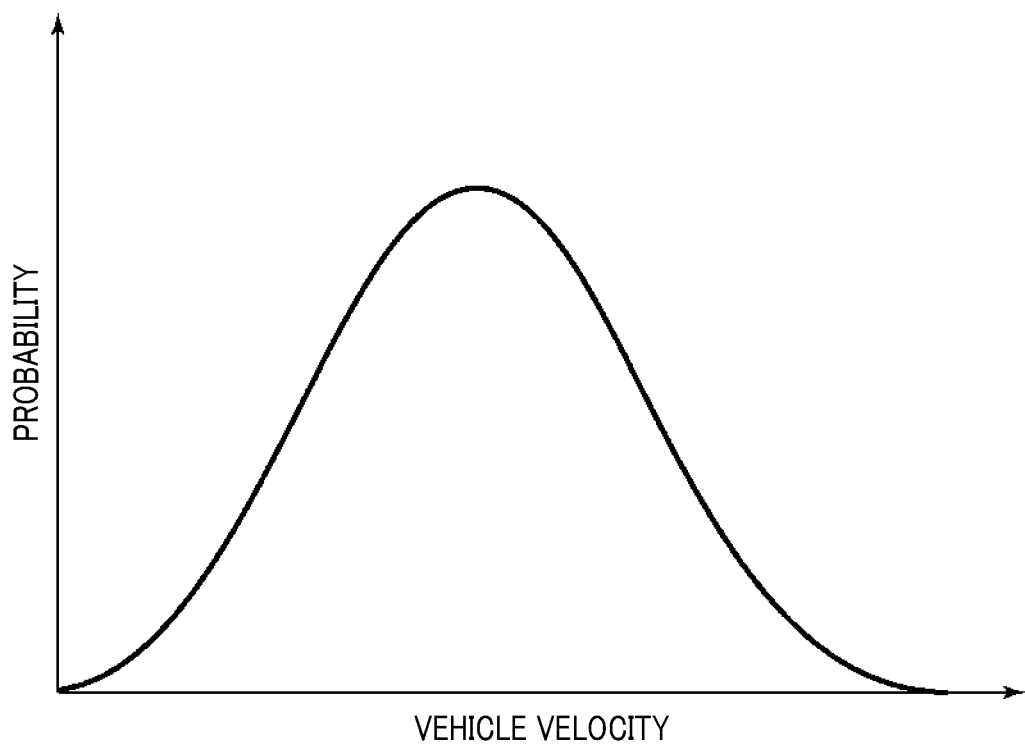
FIG. 6 is a graph showing a relationship between vehicle velocity and probability used by the prediction ECU in the first embodiment.

In the formulas f2 and f3, $p_i$ represents the occurrence probability of behavior of the i-th surrounding vehicle. More specifically, in the present embodiment, the probability $p_i$ is used as a parameter for certainty of appearance of the state amount of the i-th surrounding vehicle when the own vehicle 10 is traveling with the state amount b(t), considering that the prediction result of the behavior of the i-th surrounding vehicle includes predetermined uncertainty. For example, the velocity of the i-th surrounding vehicle at a predetermined time can be represented by probability as shown in FIG. 6.

With the use of the expected value $E_{brk}(b(t))$ of braking energy and the expected value $C(b(t))$ of the following performance evaluation value of the own vehicle, an evaluation function $F_{E1}$ can be formed as expressed by the following formula f4:

[Math. 3]

$$F_{E1} = \min\{kE_{brk}(b(t)) + (1-k)C(b(t))\} \quad (f4)$$

$$= \min \sum_{i=1}^{n} p_i \left\{ kE_{brk\ i}(b(t)) + (1-k) \int_0^T y_i(b(t)) dt \right\}$$

In the formula f4, k represents respective weighting coefficients of the braking energy and the following performance evaluation value. The coefficient k is set within a range of 0≤k≤1. In the present embodiment, the weighting coefficients take on predetermined values.

Determining the state amount b(t) of the own vehicle 10 such that the value of the evaluation function $F_{E1}$ becomes minimum makes it possible to obtain the state amount b(t) of the own vehicle 10 with the braking energy suppressed while ensuring the following performance. In other words, it is possible to obtain the state amount b(t) of the own vehicle 10 that can improve the fuel economy while ensuring the following performance.

Based on the following method, the prediction ECU 33 executes the determination processing in step S13. Specifically, the prediction ECU 33 uses a calculating equation previously obtained by experiment or the like, for example, as the calculating equation of the braking energy $E_{brk\ i}(b(t))$.

The prediction ECU 33 also calculates the predicted traveling path of the i-th surrounding vehicle from based on the predicted state amount of the i-th surrounding vehicle out of the prediction information acquired in step S12. The prediction ECU 33 also determines the ideal traveling range A based on the calculated predicted traveling path of the i-th surrounding vehicle to set the calculating equation of the following performance evaluation value $C_i(b(t))$ of the own vehicle 10.

The prediction ECU 33 further acquires the traveling models from the server device 41 via the communication unit 36 and calculates the occurrence probability $p_i$ of the state amount of the i-th surrounding vehicle based on the acquired traveling models and the state amount of the i-th surrounding vehicle.

In this manner, the prediction ECU 33 determines the calculating equation of the braking energy $E_{brk}\ i(b(t))$ in the foregoing formula f4, the calculating equation of the following performance evaluation value $C_i(b(t))$, and the occurrence probability $p_i$, and then determines the state amount b(t) of the own vehicle 10 such that the value of the evaluation function $F_{E1}$ becomes minimum. The evaluation function $F_{E1}$ may be minimized such that a plurality of patterns of behavior of the own vehicle 10 is figured out and the respective values of the evaluation function in these patterns are calculated, and then the state amount b(t) of the own vehicle 10 with the minimum value of the evaluation function $F_{E1}$ is selected. Otherwise, the evaluation function $F_{E1}$ may be set to be minimum by using the optimization method. Since the state amount b(t) is a function of acceleration of the vehicle 10, the prediction ECU 33 can obtain from the foregoing calculation, a second set value α2 of the acceleration command value α such that the evaluation function $F_{E1}$ becomes minimum.

The prediction ECU 33 may obtain a second set value α2 with which the vehicle 10 can be subjected to the coasting control by setting a lower limit of the second set value α2 when calculating the second set value α2 of the acceleration command value α. This makes it possible to avoid generation of braking energy in the vehicle 10 when the vehicle 10 is decelerated using the second set value α2 as the acceleration command value α, thereby improving the fuel economy of the vehicle 10.

In step S13, the prediction ECU 33 compares the first set value α1 and the second set value α2 to determine whether the vehicle 10 needs deceleration. Specifically, when the first set value α1 is equal to or smaller than the second set value α2, the prediction ECU 33 determines that the vehicle 10 needs no deceleration. That is, the prediction ECU 33 makes a negative determination in step S13. In this case, the prediction ECU 33 determines that no adverse-effect change has occurred in a surrounding environment around the own vehicle, the adverse-effect change being likely to have an adverse effect on a fuel economy of the own vehicle 10. When the prediction ECU 33 makes a negative determination in step S13, the ACC ECU 32 transmits the acceleration command value α set as the first set value α1 to the EV ECU 31 in step S15.

When determining in step S13 that the second set value α2 is smaller than the first set value α1, the prediction ECU 33 determines that the vehicle 10 needs deceleration. That is, the prediction ECU 33 makes an affirmative determination in step S13. In this case, the prediction ECU 33 determines that an adverse-effect change has occurred in a surrounding environment around the own vehicle, the adverse-effect change being likely to have an adverse effect on a fuel economy of the own vehicle 10. When the prediction ECU 33 makes an affirmative determination in step S13, the ACC ECU 32 changes the acceleration command value α from the first set value α1 to the second set value α2 in step S14. Then, in step S15, the ACC ECU 32 transmits the acceleration command value α set as the second set value α2 to the EV ECU 31. Accordingly, the second set value α2 which is smaller than the first set value α1 and set under the ACC control is transmitted to the EV ECU 31, as the acceleration command value α. Thus, the ACC ECU 32 implements a deceleration control to decelerate the own vehicle 10 at a lower deceleration than the deceleration settable under the ACC control.

Next, an operation example of the vehicle control device 50 in the present embodiment will be described.

Figure 7A:
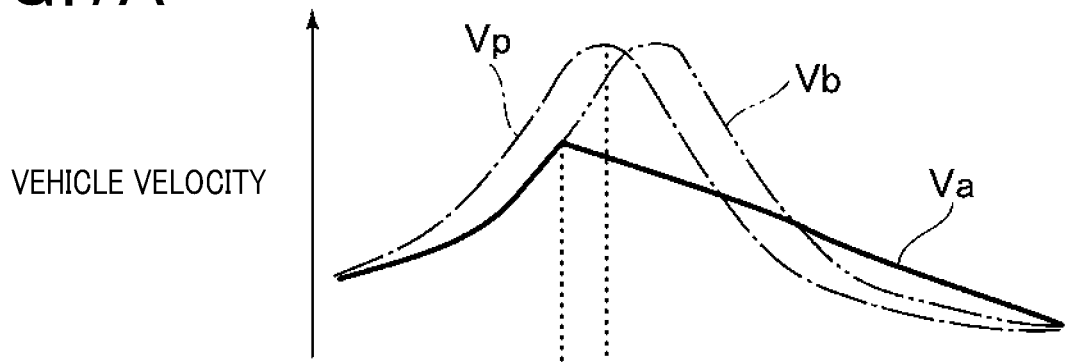
FIGS. 7A to 7C are timing charts showing the transitions of vehicle velocity, driving energy, and inter-vehicle distance of the vehicle in the first embodiment.

Suppose that a velocity Vp of the preceding vehicle suddenly drops from time t11 as shown by a dashed-dotted line in FIG. 7(A). In such a situation, the time headway and relative velocities of the own vehicle 10 and the preceding vehicle sharply decrease. Thus, when only the ACC control is being executed, the regenerative control is executed after time t11 so that driving energy Ec of the vehicle 10 decreases sharply as shown by a dashed-two dotted line in FIG. 7(B). Referring to the driving energy Ec shown in FIG. 7(B), the magnitude of the driving energy Ec for traveling the vehicle 10 generated by the motor generator 20 is represented by a positive value and the magnitude of the braking energy generated under the regenerative control is represented by a negative value. The execution of this regenerative control increases an inter-vehicle distance Lc between the own vehicle 10 and the preceding vehicle after time t11 as shown by a dashed-two dotted line in FIG. 7(C), and decreases the velocity Vb of the own vehicle 10 as shown by a dashed-two dotted line in FIG. 7(A). In this manner, when the braking energy is generated, part of the braking energy is converted into thermal energy or the like, which results in energy loss.

Figure 7B:
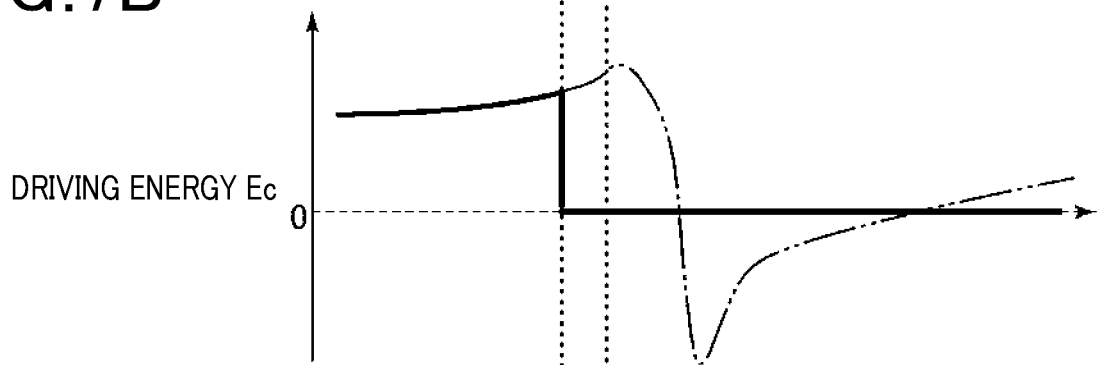
Figure 7C:
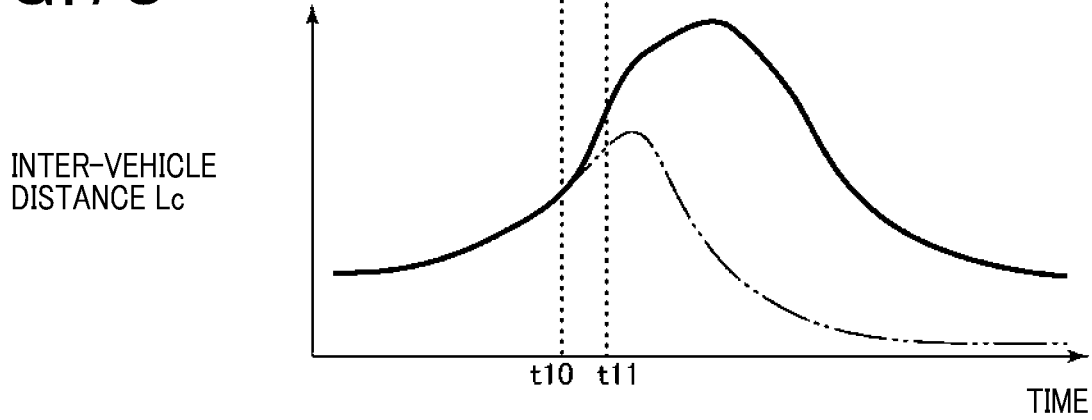

In this respect, in the present embodiment, when predicting at time t10 earlier than time t11 that the braking energy will be generated after time t11, the prediction ECU 33 calculates the second set value α2 of the acceleration command value α with which the braking energy can be suppressed by the foregoing formula f4, and sets the acceleration command value α to the second set value α2. After the transmission of the acceleration command value α from the ACC ECU 32 to the EV ECU 31, when the EV ECU 31 sets the motive power command value to zero, for example, the driving energy Ec of the motor generator 20 becomes zero at time t10 as shown by a solid line in FIG. 7(B). Accordingly, the velocity Va of the vehicle 10 decreases after time t10 as shown by a solid line in FIG. 7(A), and the inter-vehicle distance Lc between the own vehicle 10 and the preceding vehicle increases as shown by a solid line in FIG. 7(C). In this manner, decelerating the vehicle 10 makes it possible to suppress the generation of the braking energy as shown in FIG. 7(B), thereby resulting in improvement of fuel economy of the vehicle 10.

According to the vehicle control device 50 in the present embodiment described above, it is possible to obtain the following operations and advantageous effects (1) to (7):

(1) When the prediction ECU 33 predicts that an adverse-effect change has occurred in a surrounding environment around the own vehicle, the adverse-effect change being likely to have an adverse effect on a fuel economy of the own vehicle 10, the ACC ECU 32 executes the prediction control under which the acceleration of the own vehicle 10 can be limited. Accordingly, the acceleration of the own vehicle 10 is limited in advance when an adverse-effect change has occurred in a surrounding environment around the own vehicle, the adverse-effect change being likely to have an adverse effect on a fuel economy of the own vehicle 10. This makes it possible to avoid a situation where the own vehicle 10 actually becomes impaired in fuel economy, thereby improving the fuel economy of the own vehicle 10.

(2) When predicting that a deceleration requirement change has occurred in a surrounding environment around the own vehicle, the deceleration requirement change being required for delectation of the own vehicle 10, the ACC ECU 32 predicts that an adverse-effect change has occurred in a surrounding environment around the own vehicle, the adverse-effect change being likely to have an adverse effect on a fuel economy of the own vehicle 10. When predicting that a deceleration requirement change has occurred in a surrounding environment around the own vehicle, the deceleration requirement change being required for delectation of the own vehicle 10, the ACC ECU 32 executes the acceleration control to actually limit the acceleration of the vehicle 10 by the use of the second set value α2 of the acceleration command value α which is smaller than the first set value α1 and is set by the ACC control. Accordingly, as the prediction control, the ACC ECU 32 executes the deceleration control to decelerate the own vehicle at a deceleration smaller than the deceleration settable by the ACC control. According to this configuration, it is possible to reduce energy loss that could occur at the deceleration for keeping the inter-vehicle distance.

(3) The prediction ECU 33 predicts whether a deceleration requirement change has occurred in a surrounding environment around the own vehicle, the deceleration requirement change being required for delectation of the own vehicle 10, based on an index for the fuel economy of the own vehicle 10 and an index for the following performance of the own vehicle to the preceding vehicle. Specifically, the prediction ECU 33 uses, as the index for the fuel economy of the own vehicle 10, the predicted value of the braking energy which is predicted that the change in the surrounding environment occurs when the own vehicle 10 is decelerated by execution of the ACC control during a period of time from the present to a predetermined time later. The prediction ECU 33 also uses, as the index for the following performance of the own vehicle to the preceding vehicle, the deviation amount $y_i$ of the position of the own vehicle, the sum of deviations in position of the own vehicle from an ideal traveling that is based on the ACC control during a period from the present time to a predetermined future time. Accordingly, the prediction ECU 33 can reliably determine on the deceleration of the vehicle 10 in order to obtain the effects of improving the target fuel economy and suppressing the decrease of the following performance.

(4) The prediction ECU 33 represents the index for the fuel economy of the own vehicle 10 and the index for the following performance of the own vehicle to the preceding vehicle as probability information as shown in the foregoing formulas f2 and f3. The prediction ECU 33 uses the function expressed by the formula f4 as the evaluation function including the expected value based on the index for the fuel economy of the own vehicle 10 and the expected value based on the index for the following performance of the own vehicle 10 to the preceding vehicle, and predicts, based on the calculated value in the formula f4, a deceleration requirement change has occurred in a surrounding environment around the own vehicle, the deceleration requirement change being required for delectation of the own vehicle 10. Accordingly, the prediction ECU 33 can reliably determine on the deceleration of the vehicle 10 in order to obtain the effects of improving the fuel economy and suppressing the decrease of the following performance even if the prediction information on a change in the surrounding environment includes uncertainty.

(5) The prediction ECU 33 calculates the second set value α2 of the acceleration command value with which the vehicle 10 can be subjected to the coasting control. Accordingly, the ACC ECU 32 executes the coasting control to coast the own vehicle 10 in a state where the output from the motor generator 20 does not transfer to the wheels of the vehicle 10. According to this configuration, it is possible to decelerate the vehicle 10 with higher fuel economy when the vehicle 10 is decelerated by using the prediction information.

(6) The ACC ECU 32 repeatedly accelerates and decelerates the own vehicle 10 to execute a burn-and-coast control under which the own vehicle 10 follows the preceding vehicle. Accordingly, the vehicle 10 can generally run by a traveling method with high fuel efficiency.

(7) The prediction ECU 33 predicts the deceleration of the preceding vehicle as an adverse-effect change has occurred in a surrounding environment around the own vehicle, the adverse-effect change being likely to have an adverse effect on a fuel economy of the own vehicle. Accordingly, it is possible to improve the fuel economy against a change in the surrounding environment that greatly affects the fuel economy.

Modification Example

Next, a modification example of the vehicle control device 50 in the first embodiment will be described.

As shown by a broken line in FIG. 1, a vehicle control device 50 in the present modification example further has a human machine interface (HMI) ECU 37. The HMI ECU 37 is a part that controls a notification device 38 installed in the vehicle 10 to make various notifications to the occupant of the vehicle 10. The notification device 38 can be a speaker, a display, or the like.

In step S15 shown in FIG. 4, the ACC ECU 32 transmits the acceleration command value α to the HMI ECU 37. The HMI ECU 37 executes an instruction control to instruct the occupant of the own vehicle 10 on a driving method such that the acceleration of the own vehicle 10 is limited, based on the acceleration command value α transmitted from the ACC ECU 32. For example, the HMI ECU 37 instructs the occupant on the driving method by causing the occupant to recognize the acceleration and velocity corresponding to the acceleration command value α by sound from the speaker or by displaying the acceleration and velocity corresponding to the acceleration command value α on the display.

The HMI ECU 37 may instruct the occupant on the driving method by adjusting the push-down amount of the accelerator pedal or adjusting the push-down amount of the brake pedal based on the acceleration command value α.

The vehicle 10 can be decelerated even by this method.

Second Embodiment

Next, a vehicle control device 50 in a second embodiment will be described. The description below focuses on the differences from the vehicle control device 50 in the first embodiment. First, a schematic configuration of the vehicle 10 equipped with the vehicle control device 50 in the second embodiment will be explained.

Figure 8:
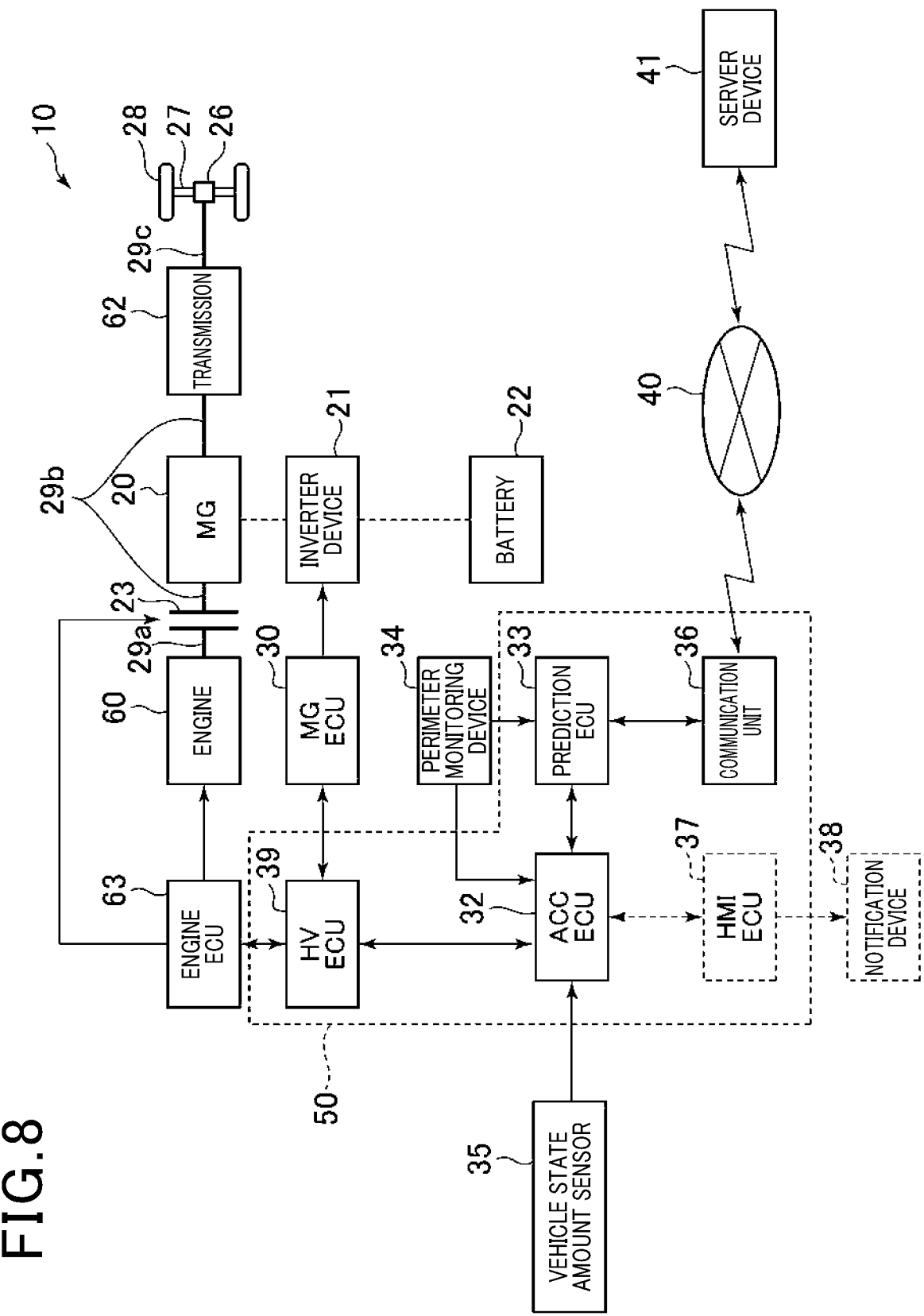
FIG. 8 is a block diagram showing a schematic configuration of a vehicle in a second embodiment.

As illustrated in FIG. 8, the vehicle 10 in the present embodiment is a hybrid automobile that uses not only the motor generator 20 but also an engine 60 as motive power sources. The engine 60 is driven to rotate a first motive power transmission shaft 29a. The first motive power transmission shaft 29a is coupled to a second motive power transmission shaft 29b via a clutch 23. The clutch 23 is switchable between a connection state in which the first motive power transmission shaft 29a and the second motive power transmission shaft 29b are coupled to allow transfer of motive power between these shafts and a non-connection state in which the first motive power transmission shaft 29a and the second motive power transmission shaft 29b are decoupled to shut off transfer of motive power between these shafts.

The motor generator 20 applies motive power to the second motive power transmission shaft 29b based on the energization. Therefore, when the clutch 23 is in the connection state, the second motive power transmission shaft 29b is supplied with motive power from at least one of the engine 60 and the motor generator 20. The motive power supplied to the second motive power transmission shaft 29b is input into a transmission 62.

Specifically, the transmission 62 increases or decreases the total motive power of the engine 60 and the motor generator 20 input from the second motive power transmission shaft 29b, and transfers the increased or decreased total motive power to a third motive power transmission shaft 29c. Alternatively, the transmission 62 subtracts, from the motive power of the engine 60, motive power converted by the motor-generator 20 into electric power to thereby obtain resultant motive power, and increases or decreases the resultant motive power. Then, the transmission shaft 62 transfers the increased or decreased resultant power to the third motive power transmission shaft 29c.

The motive power transferred to the third motive power transmission shaft 29C is then transferred to the wheel 28 of the vehicle 10 via the differential gear 26 and the drive shaft 27. Accordingly, the vehicle 10 starts to run. In this manner, in the present embodiment, the motor generator 20 and the engine 60 correspond to a power train.

The vehicle 10 is equipped with an engine ECU 63 that comprehensively controls the driving of the engine 60. The engine ECU 63 controls the driving of the clutch 23.

The vehicle 10 is equipped with a hybrid vehicle (HV) ECU 39 instead of the EV ECU 31. The HV ECU 39 exchanges information necessary for control with the MG ECU 30 and the engine ECU 63 to perform an integrated adjustment control of the engine 60, the motor generator 20, and the battery 22. Specifically, the HV ECU 39 controls the driving of the motor generator 20 and the engine 60 based on the acceleration command value transmitted from the ACC ECU 32. When the engine 60 is stopped and the acceleration command value α is equal to or greater than a predetermined acceleration threshold αth, the HV ECU 39 transmits a predetermined motive power command value to the engine ECU 63 to restart the engine 60, whereby the vehicle 10 is accelerated. When the acceleration command value α is smaller than the acceleration threshold αth, the HV ECU 39 transmits a command for stopping the engine 60 to the engine ECU 63 and transmits a predetermined motive power command value to the MG ECU 30 to suppress fuel consumption, whereby the vehicle 10 performs EV traveling. In the present embodiment, the HV ECU 39 corresponds to a traveling control unit that controls the driving and stop of the engine 60 and the motor generator 20 based on the traveling state of the own vehicle 10.

Next, a procedure for a prediction control process executed by the ACC ECU 32 and the prediction ECU 33 will be specifically described with reference to FIG. 9. The ACC ECU 32 and the prediction ECU 33 repeatedly execute the process shown in FIG. 9 in predetermined cycles.

Figure 9:
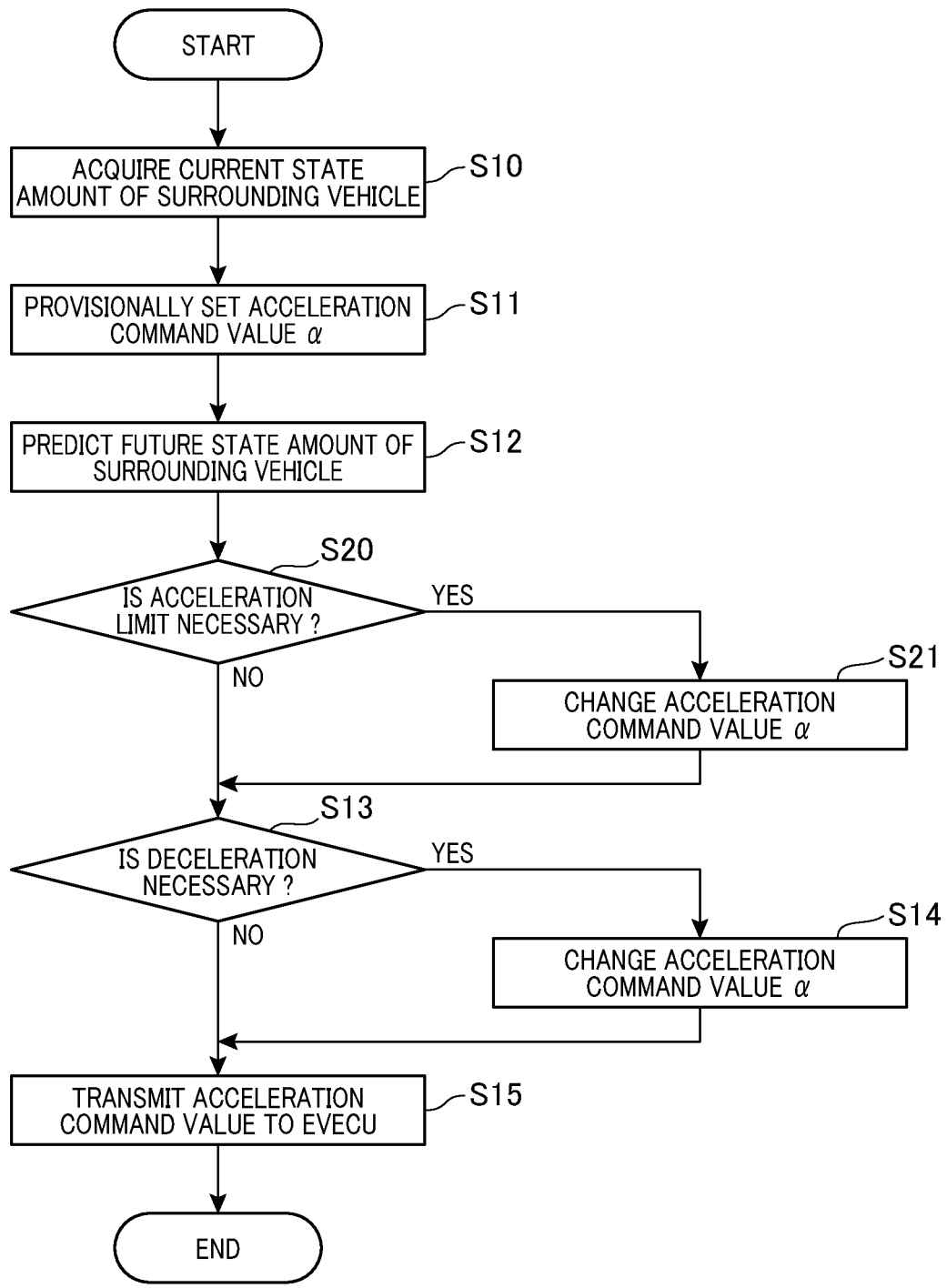
FIG. 9 is a flowchart showing a procedure of processing executed by an ACC ECU and a prediction ECU in the second embodiment.

As shown in FIG. 9, subsequent to step S12, the prediction ECU 33 determines in step S20 whether it is necessary to limit the acceleration of the vehicle 10 for suppressing short-time driving of the engine 60. This determination is specifically executed by the method as described below.

The efficiency of deriving energy from the engine 60 may become deteriorated due to a delay in air intake by the engine 60, increase in energy consumption for start of the engine 60, increase in fuel consumption at the start of the engine 60, and the like. Taking these factors into account, actual engine efficiency $\eta_{eng}$ at engine traveling is expressed by the following formula f5:

[Math. 4]

$$\eta_{eng} = \frac{E_{out} \times \delta_{delay}}{E_{in} + \left(\frac{1}{\eta_e} E_{egon} + E_{add}\right)\frac{1}{T_{acc}}} \quad (f5)$$

In the formula f5, $\delta_{delay}$ represents a coefficient of air intake delay, $\eta_e$ represents ideal engine efficiency that is engine efficiency when the engine 60 is operated in a steady state, $E_{out}$ represents ideal output energy of the engine 60, $E_{egon}$ represents start energy of the engine 60, $E_{in}$ represents input fuel energy of the engine 60, $E_{add}$ represents start-time additional energy, and $T_{acc}$ represents time necessary for acceleration.

The actual engine efficiency $\eta^*_{eng}$ on the left side of the formula f5 is used as the index for the fuel economy of the own vehicle 10. The value on the right side of the formula f5 indicates the ratio of the output energy of the engine to the input energy of the engine.

On the other hand, when the actual engine efficiency of the vehicle 10 in EV traveling state where the vehicle 10 runs only by motive power of the motor generator 20 is defined by system efficiency $\eta_{sys}$ based on the traveling result up to the present, the actual engine efficiency $\eta_{sys}$ in the EV traveling state can be expressed by the following formula f6:

[Math. 5]

$$\eta_{sys} = \frac{E_{sysout}}{E_{sysin}} \quad (f6)$$

In the formula f6, $E_{sysout}$ represents the output energy of the power train, and $E_{sysin}$ represents input fuel energy.

The actual engine efficiency $\eta_{sys}$ in the EV traveling state indicates the ratio of the output energy of the power train to the input energy of the power train of the own vehicle 10 in the state where the engine 60 is stopped.

Figure 10:
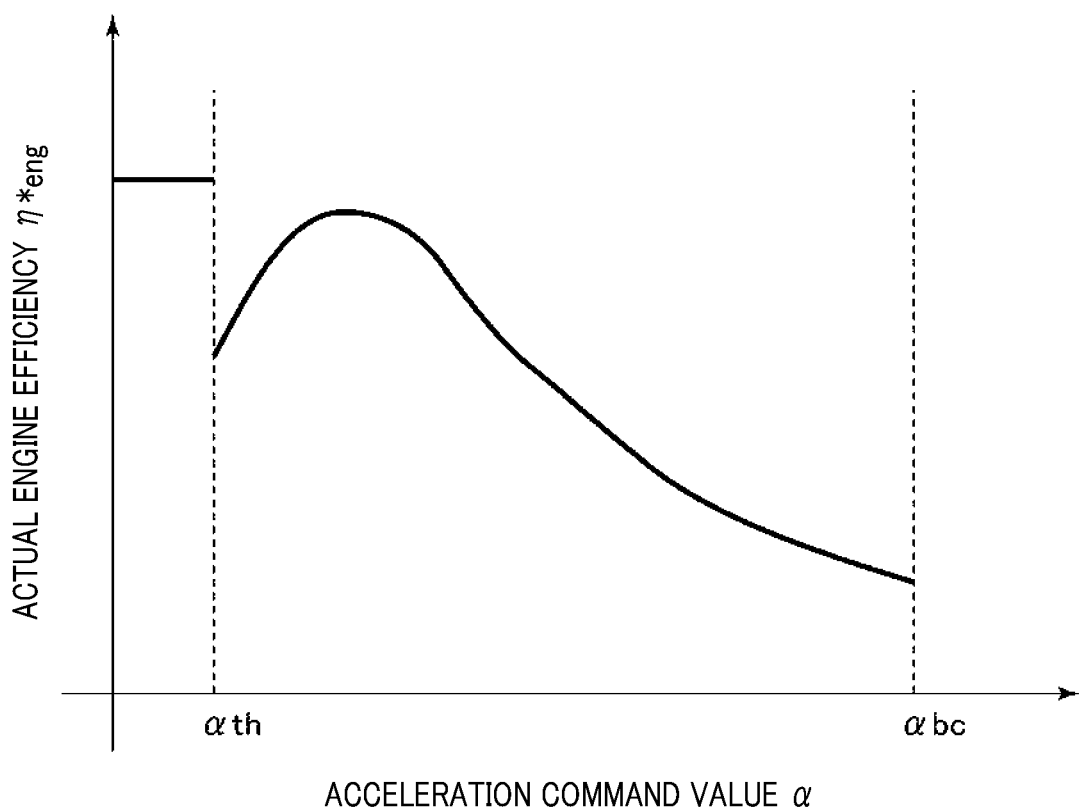
FIG. 10 is a map showing a relationship between acceleration and actual engine efficiency used by the prediction ECU in the second embodiment.

From the foregoing, the future actual engine efficiency $\eta^*_{eng}$ with respect to the acceleration command value $\alpha$ can be expressed as shown in FIG. 10. That is, when the acceleration command value $\alpha$ is smaller than the acceleration threshold $\alpha$th, the vehicle 10 runs by the motive power of the motor generator 20, and thus the future actual engine efficiency $\eta^*_{eng}$ takes on the value on the right side of the formula f6. When the acceleration command value $\alpha$ is equal to or greater than the acceleration threshold $\alpha$th and is smaller than an acceleration command value $\alpha$bc that is used for acceleration in the burn-and-coast control during the ACC control, the future actual engine efficiency $\eta^*_{eng}$ can be determined by the right side of the formula f5. The thus determined future actual engine efficiency $\eta^*_{eng}$ indicates the ratio of the output energy of the power train to the input energy of the power train of the own vehicle 10.

As under the deceleration control for suppression of the braking energy described above in relation to the first embodiment, when the own vehicle 10 runs with the predetermined state amount b(t) with respect to the i-th surrounding vehicle, an expected value $\eta^*_{eng}(b(t))$ of the actual engine efficiency $\eta^*_{eng}$ of the own vehicle 10 at that time can be determined by the following formula f7:

[Math. 6]

$$\eta^*_{eng}(b(t)) = \sum_{i=1}^{N} p_i \eta^o_{eng\,i}(b(t)) \quad (f7)$$

The use of the expected value $\eta^*_{eng}(b(t))$ makes it possible to form an evaluation function $F_{E2}$ as expressed by the following formula f8:

[Math. 7]

$$F_{E2} = \min\{k/\eta^*_{eng}(b(t)) + (1-k)C(b(t))\} \quad (f8)$$

$$= \min \sum_{i=1}^{n} p_i \left\{ k/(p_i \eta^*_{eng\,i}(b(t))) + (1-k) \int_0^T y_i(b(t))dt \right\}$$

Determining the state amount b(t) of the own vehicle 10 such that the evaluation function $F_{E2}$ becomes minimum makes it possible to obtain the state amount b(t) of the own vehicle 10 with which the short-time driving of the engine 60 is suppressed while ensuring the following performance. In other words, it is possible to obtain the state amount b(t) of the own vehicle 10 that improves the fuel economy while ensuring the following performance.

Based on the foregoing method, the prediction ECU 33 executes the determination processing in step S20. Specifically, the prediction ECU 33 has a map that indicates a relationship between the acceleration command value $\alpha$ and the actual engine efficiency $\eta^*_{eng}$ as shown in FIG. 10. The prediction ECU 33 accumulates data on the output energy and the input fuel energy of the power train up to the present, and sequentially calculates the actual engine efficiency $\eta_{sys}$ in the EV traveling state from the formula f6 based on the accumulated data. The prediction ECU 33 uses the calculated actual engine efficiency $\eta_{sys}$ as actual engine efficiency $\eta^*_{eng}$ where the acceleration command value $\alpha$ is smaller than the acceleration threshold $\alpha$th.

The prediction ECU 33 determines the state amount b(t) of the own vehicle 10 such that the evaluation function $F_{E2}$ becomes minimum. Since the state amount b(t) is a function of acceleration of the vehicle 10, the prediction ECU 33 can obtain from the foregoing calculation a third set value $\alpha$3 of the acceleration command value $\alpha$ with which the value of the evaluation function $F_{E2}$ becomes minimum.

In step S20, the prediction ECU 33 compares the first set value $\alpha$1 with the third set value $\alpha$3 to determine whether it is necessary to limit the acceleration of the vehicle 10 in order to suppress the short-time driving of the engine 60. Specifically, when the first set value $\alpha$1 is equal to or smaller than the third set value $\alpha$3, the prediction ECU 33 determines that it is not necessary to limit the acceleration of the vehicle 10. That is, the prediction ECU 33 makes a negative determination in step S20. In this case, the prediction ECU 33 determines that there has not occurred a change in the surrounding environment by which the own vehicle 10 will become impaired in fuel economy. Then, the ACC ECU 32 and the prediction ECU 33 execute step S13 and the subsequent steps.

When the third set value α3 is smaller than the first set value α1, the prediction ECU 33 determines that it is necessary to limit the acceleration of the vehicle 10. That is, the prediction ECU 33 makes an affirmative determination in step S20. In this case, the prediction ECU 33 determines that an adverse-effect change has occurred in a surrounding environment around the own vehicle, the adverse-effect change being likely to have an adverse effect on a fuel economy of the own vehicle 10. When the prediction ECU 33 makes an affirmative determination in step S20, the ACC ECU 32 changes the acceleration command value α from the first set value α1 to the third set value α3 in step S21. After that, the ACC ECU 32 and the prediction ECU 33 execute step S13 and the subsequent steps.

In step S13, the prediction ECU 33 compares the first set value α1, the second set value α2, and the third set value α3 to determine whether the vehicle 10 needs deceleration. Specifically, when the third set value α3 is smaller than the first set value α1 and the third set value α3 is smaller than the second set value α2, the prediction ECU 33 makes an affirmative determination in step S13. On the other hand, when the first set value α1 is equal to or smaller than the third set value α3 or the second set value α2 is equal to or smaller than the third set value α3, the prediction ECU 33 makes a negative determination in step S13.

Next, an operation example of the vehicle control device 50 in the present embodiment will be described.

Figure 11A:
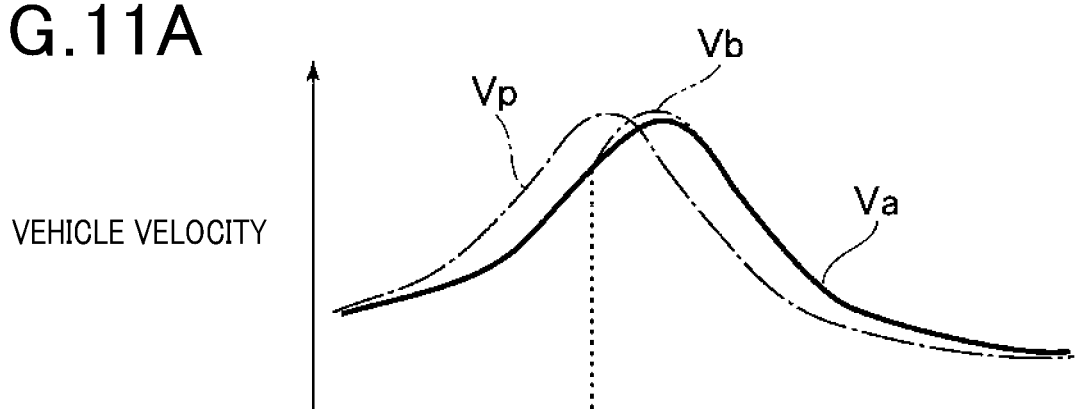
FIGS. 11A to 11C are timing charts showing the transitions of vehicle velocity, driving energy, and engine rotation speed in the vehicle in the second embodiment.

Suppose that the velocity Vp of the preceding vehicle sharply increases and then sharply decreases as shown by a dashed-dotted line in FIG. 11(A). In such a situation, when only the ACC control is executed, the ACC ECU 32 starts the engine 60 at time t20 to cause the own vehicle 10 to follow the preceding vehicle. When the ACC ECU 32 starts the engine 60 at time t20, the driving energy Ec of the vehicle 10 becomes larger than energy Es at the time of engine start as shown by a dashed-two dotted line in FIG. 11(B). In addition, the rotation speed Nc of the engine 60 increases after time t20 as shown by a dashed-two dotted line in FIG. 11(C).

Then, when the preceding vehicle suddenly decelerates, the time headway and relative velocities between the own vehicle 10 and the preceding vehicle sharply decrease. Accordingly, when the regenerative control is executed at time t21, the driving energy Ec of the vehicle 10 sharply decreases as shown by a dashed-two dotted line in FIG. 11(B). Due to the execution of this regenerative control, the rotation speed Nc of the engine 60 sharply decreases after time t21 and the engine 60 stops, as shown by a dashed-two dotted line in FIG. 11(C). In this manner, when the engine 60 is started and then stopped in a short time, the energy used for the start of the engine 60 is lost.

Figure 11B:
Figure 11C:
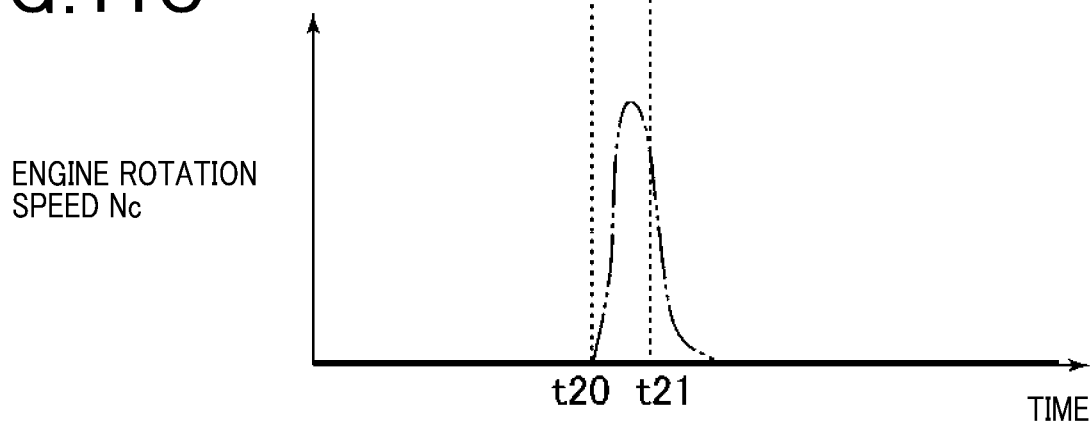

In this respect, the prediction ECU 33 of the present embodiment calculates, by the foregoing formula f8, the third set value α3 of the acceleration command value with which the short-time driving of the engine 60 can be suppressed, and sets the acceleration command value α to the third set value α3. When the acceleration command value α is transmitted from the ACC ECU 32 to the HV ECU 39, the actual acceleration of the vehicle 10 is hard to increase to the acceleration threshold αth with which the engine 60 is supposed to start, and thus the engine 60 will not start. Accordingly, the velocity Vc of the vehicle 10 decreases as shown in FIG. 11(A) and the driving energy Ec of the vehicle 10 does not increase to the energy Es at the time of engine start as shown in FIG. 11(B). Therefore, it is possible to suppress a waste of the energy Es at the time of engine start, thereby resulting in improvement of the fuel economy of the vehicle 10.

According to the vehicle control device 50 in the present embodiment described above, it is possible to obtain not only the foregoing operations and advantageous effects (1) to (7) but also the following operations and advantageous effects (8) to (10):

(8) The ACC ECU 32 limits the acceleration of the own vehicle 10 such that the engine 60 is unlikely to restart by the engine ECU 63. Accordingly, the short-time driving of the engine 60 can be suppressed to decrease energy loss. This improves the fuel economy of the vehicle 10.

(9) The prediction ECU 33 determines whether to limit the acceleration of the own vehicle 10 based on the index for the fuel economy of the own vehicle 10 and the index for the following performance of the own vehicle 10 to the preceding vehicle. Specifically, as the index for the fuel economy of the own vehicle 10, the prediction ECU 33 uses the predicted value of the ratio of the output energy of the power train to the input energy of the power train of the own vehicle 10 during a period from a present time to a predetermined future time as shown in the formula f7. In addition, as the index for the following performance of the own vehicle 10 to the preceding vehicle, the prediction ECU 33 uses the deviation amount $y_i$ of the position of the own vehicle from the ideal value in the ACC control during a period of time from the present to a predetermined time later. Accordingly, it is possible to reliably determine on the deceleration of the vehicle 10 in order to obtain the effects of improving the target fuel economy and suppressing the decrease of the following performance.

(10) The predicted value of the ratio of the output energy of the power train to the input energy of the power train of the own vehicle 10 includes the predicted value shown by the formula f5 and the predicted value shown by the formula f6. The predicted value shown by the formula f5 is a predicted value of the ratio of the output energy of the engine 60 to the input energy of the engine 60 in the state where the engine 60 is driven. The predicted value shown by the formula f6 is a predicted value of the ratio of the output energy of the power train to the input energy of the power train of the own vehicle 10 in the state where the engine 60 is stopped. Accordingly, it is possible to run the vehicle 10 by the determined traveling method with high fuel efficiency even if the engine 60 is stopped.

Third Embodiment

Next, a vehicle control device 50 in a third embodiment will be described. The description below focuses on the differences from the vehicle control device 50 in the first embodiment.

In relation to the present embodiment, an example of a method for calculating the occurrence probability $p_i$ of behavior of a surrounding vehicle used in the foregoing formulas f2 and f3 will be described. For ease of explanation, the following description is based on the assumption that the occurrence probability $p_i$ of behavior of the surrounding vehicle is deceleration behavior occurrence probability as the probability that the surrounding vehicle will decelerate.

Figure 13A:
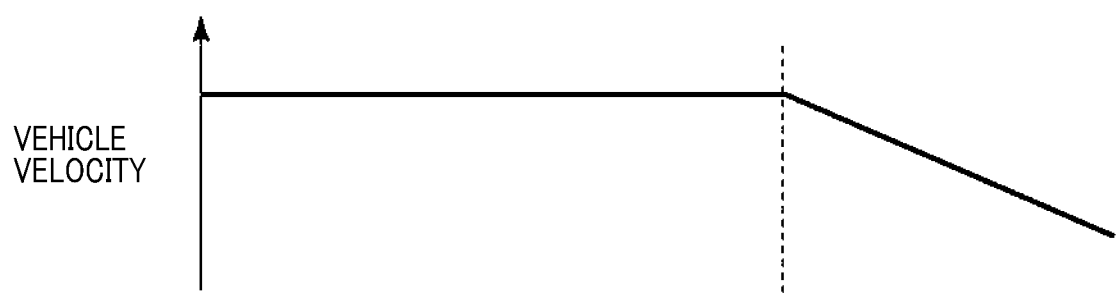
FIGS. 13A and 13B are timing charts showing an example of temporal transitions of vehicle velocity and deceleration behavior occurrence probability.
Figure 13B:
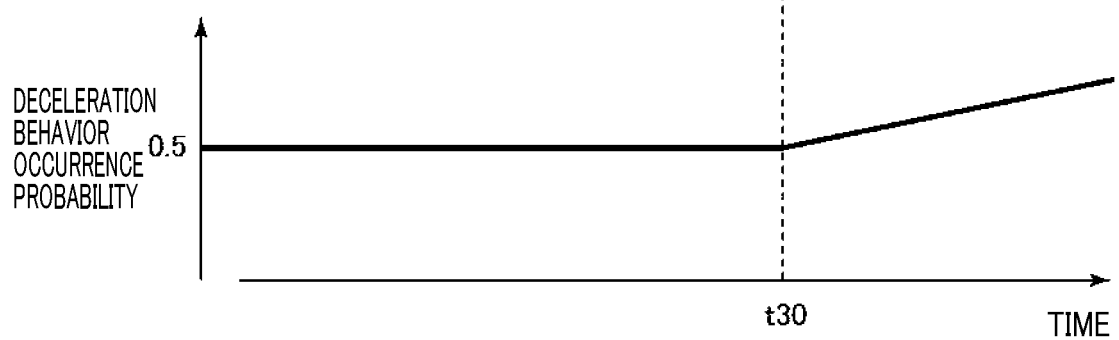

First, consider that the deceleration behavior of the vehicle is predicted at a spot where there are assumed two patterns of behavior in which the surrounding vehicle decelerates at a predetermined place and in which the surrounding vehicle passes through the predetermined place. When the perimeter monitoring device 34 acquires information as shown in FIG. 13(A) as vehicle velocity information of the surrounding vehicle, for example, it will be predicted whether the surrounding vehicle will take on deceleration behavior at the current time t30. This prediction is based on the vehicle velocity information of the surrounding vehicle at a time in the past earlier than the current time t30. As shown in FIG. 13(A), the velocity of the surrounding vehicle is constant before the time t30. Thus, before the time t30, the deceleration behavior occurrence probability that is the probability of the surrounding vehicle's undergoing deceleration behavior can be calculated as 0.5, that is, 50%, for example, as shown in FIG. 13(B). Therefore, before the time t30, the probability of the surrounding vehicle decelerating is 0.5, and the probability of the surrounding vehicle passing through is 0.5. After the time t30, when the velocity of the surrounding vehicle gradually decreases along with a lapse of time, the surrounding vehicle is considered to start deceleration behavior. Thus, the value of the deceleration behavior occurrence probability gradually increases from 0.5.

In this manner, in the case of predicting the deceleration behavior of the surrounding vehicle using the traveling data such as the past velocity information of the surrounding vehicle, the deceleration behavior occurrence probability can be calculated with higher accuracy by predicting the deceleration behavior of the surrounding vehicle with learning of the past traveling data.

On the other hand, it is possible to predict that the surrounding vehicle will take on deceleration behavior before the actual detection of deceleration of the surrounding vehicle in a situation in which the surrounding vehicle passes through a place where a plurality of vehicles will take on deceleration behavior according to statistics or in a situation in which a traffic light in front of the surrounding vehicle turns from green to yellow. If such a situation is detected before the time t30, correcting the deceleration behavior occurrence probability to a value greater than 0.5 at that time makes it possible to calculate the deceleration behavior occurrence probability that reflects not only the information of the past traveling data of the surrounding vehicle but also the information on the future predicted behavior of the surrounding vehicle. Executing the traveling control of the own vehicle 10 based on the thus calculated deceleration behavior occurrence probability makes it possible to achieve the more appropriate traveling control of the own vehicle 10 in accordance with the predicted behavior of the surrounding vehicle.

Thus, in the present embodiment, the server device 41 constructs a learning model of vehicle behavior based on the past traveling data transmitted from a predetermined vehicle. The predetermined vehicle is not limited to the own vehicle 10 but may include a vehicle different from the own vehicle 10. One or more predetermined vehicles may be set. The learning model of vehicle behavior is formed from a likelihood function that is capable of calculating a likelihood which is composed of the value indicating plausibility that a vehicle will take on predetermined behavior with respect to an observation value in the traveling data of the vehicle. The likelihood corresponds to an index indicating the similarity between the vehicle traveling data and the learning information. Based on the constructed learning model of vehicle behavior, the server device 41 creates a calculating equation by which the deceleration behavior occurrence probability of the vehicle can be obtained. This calculating equation is created, for example, in a manner as described below.

When there are assumed two situations in which a vehicle decelerates at a predetermined place and in which a vehicle passes through the predetermined place, the server device 41 construct a deceleration behavior model and a passing behavior model based on the traveling data transmitted from the predetermined vehicle. The deceleration behavior model and the passing behavior model are learning models of vehicle behavior. The traveling data includes time-series information on vehicle velocity.

The server device 41 calculates the likelihood of the deceleration behavior model and the likelihood of the passing behavior model based on the traveling data of the predetermined vehicle, and obtains a likelihood difference that is a differential value between these likelihoods. The server device 41 performs this calculation on all the past traveling data to calculate the frequency with which the deceleration behavior occurred and the frequency with which the passing behavior occurred, at the time with each of the likelihood differences. Accordingly, the server device 41 can obtain, for example, a relationship between likelihood difference and deceleration occurrence frequency as shown by a dashed-dotted line in FIG. 14 and a relationship between likelihood difference and passing occurrence frequency as shown by a dashed-two dotted line in FIG. 14. Based on the information shown in FIG. 14, the server device 41 creates a calculating equation of a learning value $p_{lm}$ of the deceleration behavior occurrence probability as shown by the following formula f9:

[Math. 8]

$$p_{lrn} = \frac{N_{dec}\left(\mu_{dec} \frac{t}{T_{stop}}, \sigma_{dec}^2 \frac{t}{T_{stop}}\right)}{N_{dec}\left(\mu_{dec} \frac{t}{T_{stop}}, \sigma_{dec}^2 \frac{t}{T_{stop}}\right) + N_{pass}\left(\mu_{pass} \frac{t}{T_{stop}}, \sigma_{pass}^2 \frac{t}{T_{stop}}\right)} \quad (f9)$$

Figure 14:
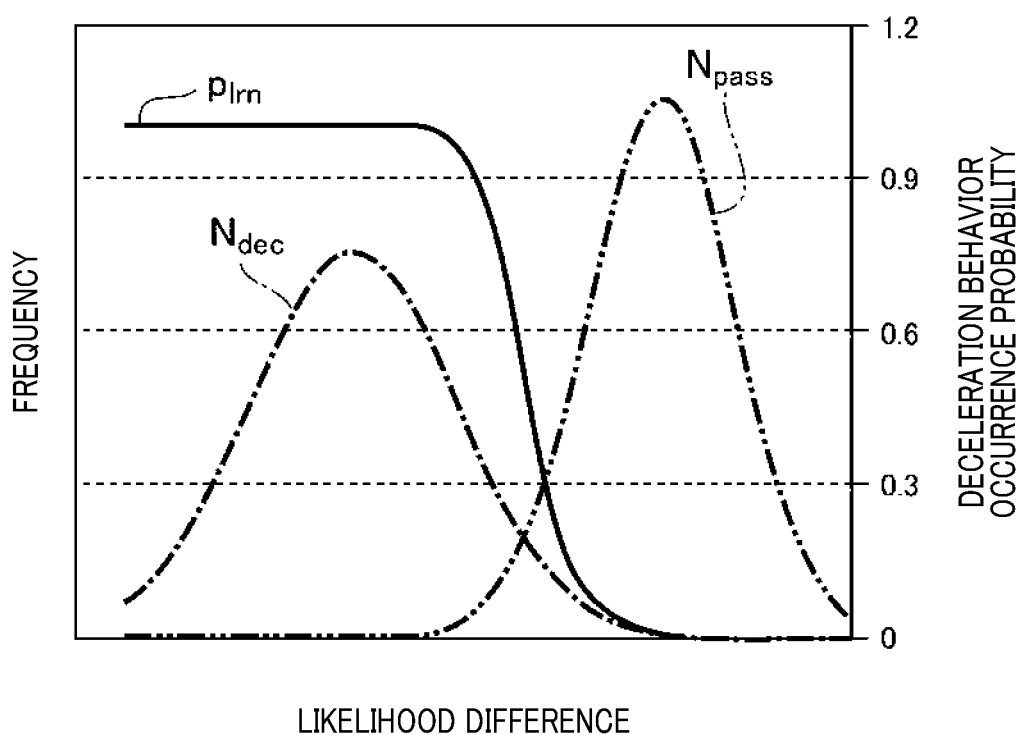
FIG. 14 is a graph showing respective transitions of a calculated value of frequency of a deceleration behavior model, a calculated value of frequency of a passing behavior model and a value of deceleration behavior occurrence probability with respect to a difference between respective likelihoods of the deceleration behavior model and the passing behavior model in a third embodiment.

In the formula f9, t represents time, t=0 represents the start time in each behavior model, t=$T_{stop}$ represents the end time in each behavior model, $\mu_{dec}$ represents the average value of the deceleration behavior models, $\sigma_{dec}^2$ represents the dispersion of the deceleration behavior models, $\mu_{pass}$ represents the average value of the passing behavior models, $\sigma_{pass}^2$ represents the dispersion of the passing behavior models, $N_{dec}$ represents the function in which the frequency of occurrence of the deceleration behavior model shown in FIG. 14 is normally distributed, $N_{pass}$ represents the function in which the frequency of occurrence of the passing behavior model shown in FIG. 14 is normally distributed, and each of variables in the functions $N_{dec}$ and $N_{pass}$ represents a value on the lateral axis shown in FIG. 14, that is, the likelihood difference between the behavior models. Thus, the formula f9 is a calculating equation by which the learning value $p_{lm}$ of the deceleration behavior occurrence probability can be obtained from the likelihood difference between the models.

The vehicle control device 50 acquires the deceleration behavior model, the passing behavior model, and the formula 9 from the server device 41. The vehicle control device 50 calculates the likelihood of the deceleration behavior model and the likelihood of the passing behavior model from the past traveling data of the surrounding vehicles detected by the perimeter monitoring device 34 during a period from the present to a time prior to a predetermined time. The vehicle control device 50 calculates a likelihood difference between the calculated likelihoods of the models, and substitutes the calculated likelihood difference between the models into the formula f9 to calculate the learning value $p_{lm}$ of the deceleration behavior occurrence probability.

On the other hand, the vehicle control device 50 in the present embodiment predicts the future deceleration behavior of the surrounding vehicles according to statistics or based on the information detected by the perimeter monitoring device 34, and calculates the occurrence probability of the predicted deceleration behavior of the surrounding vehicles. The vehicle control device 50 uses the calculated value as a predicted value $p_{ftr}$ of the deceleration occurrence probability.

The vehicle control device 50 corrects the learning value $p_{lm}$ of the deceleration behavior occurrence probability by the predicted value $p_{ftr}$ of the deceleration behavior occurrence probability to obtain final deceleration behavior occurrence probability $p_i$. Specifically, the vehicle control device 50 calculates the deceleration behavior occurrence probability $p_i$ by the following formula f10:

[Math. 9]

$$p_i = \frac{p_{lrn} - z}{z} p_{lrn} + \frac{2z - p_{lrn}}{z} p_{ftr} \tag{f10}$$

where $z=(p_{lm}+p_{lm2})/2$. In the formula, $P_{lm2}$ represents the probability that the surrounding vehicle will pass through a predetermined place. For example, the total value of $P_{lm}$ and $P_{lm2}$ is 1 in a situation in which there are assumed two patterns of behavior in which the surrounding vehicle decelerates at a predetermined place and in which the surrounding vehicle passes through the predetermined place.

According to the foregoing formula f10, when the learning value $p_{lm}$ of the deceleration behavior occurrence probability is close to 0.5, the predicted value $p_{ftr}$ of the deceleration behavior occurrence probability is dominant in the behavior occurrence probability $p_i$. When the learning value $p_{lm}$ of the deceleration behavior occurrence probability is close to 0 or 1, the learning value $p_{lm}$ of the deceleration behavior occurrence probability is dominant in the behavior occurrence probability $p_i$.

Next, a specific method for calculating the deceleration behavior occurrence probability $p_i$ will be described. Hereinafter, for the sake of convenience, the surrounding vehicle of which the deceleration behavior occurrence probability $p_i$ is to be calculated will be called specific surrounding vehicle, and the surrounding vehicles excluding the specific surrounding vehicle will be called other surrounding vehicles. The surrounding vehicles include the preceding vehicle traveling in front of the own vehicle 10 and the vehicles surrounding the own vehicle 10 excluding the preceding vehicle.

Figure 15:
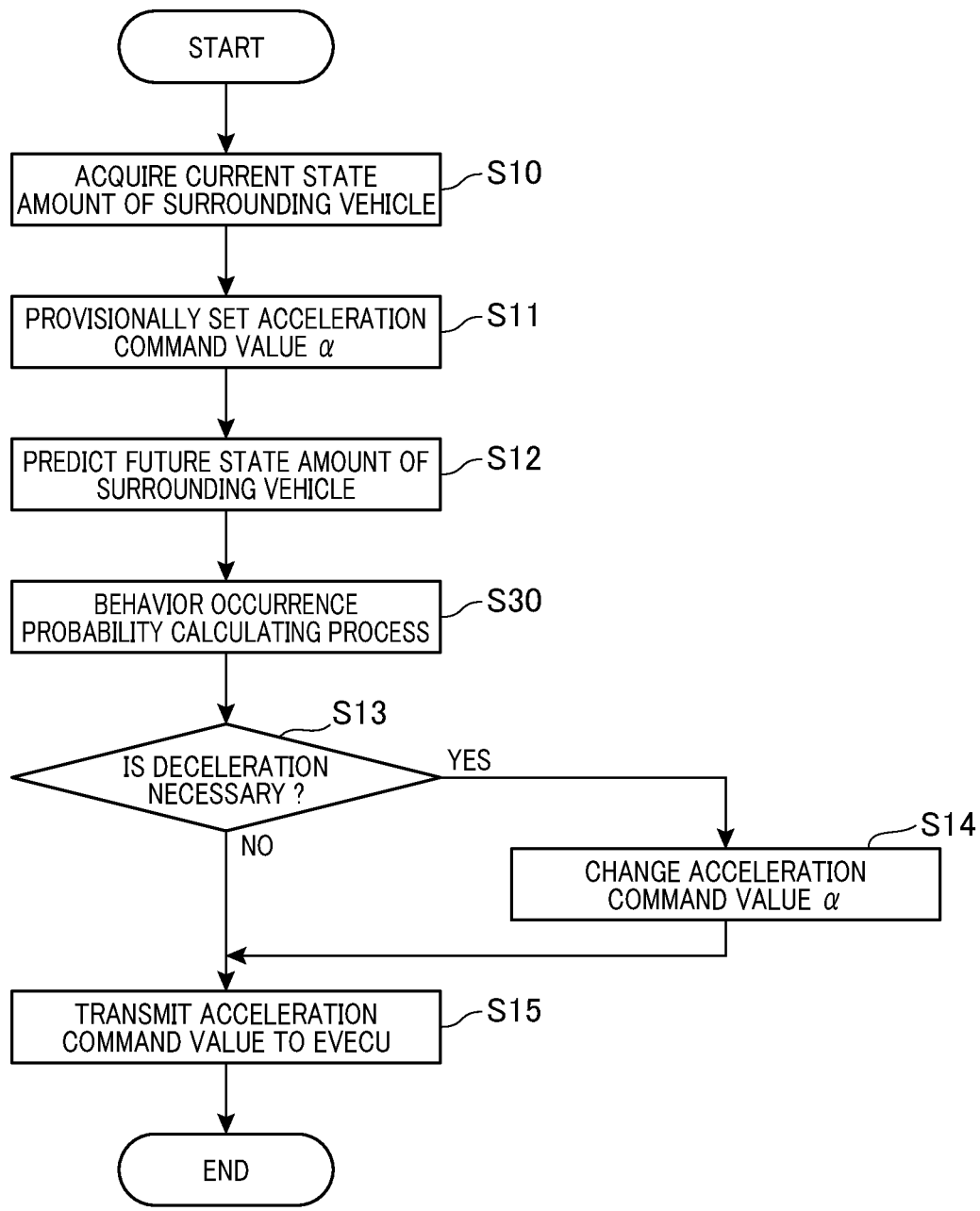
FIG. 15 is a flowchart showing a procedure of processing executed by an ACC ECU and a prediction ECU in the third embodiment.

As shown in FIG. 15, the prediction ECU 33 in the present embodiment executes deceleration behavior occurrence probability calculation processing in step S30 subsequent to step S12. The specific procedure for the deceleration behavior occurrence probability calculation processing is as shown in FIG. 16.

Figure 16:
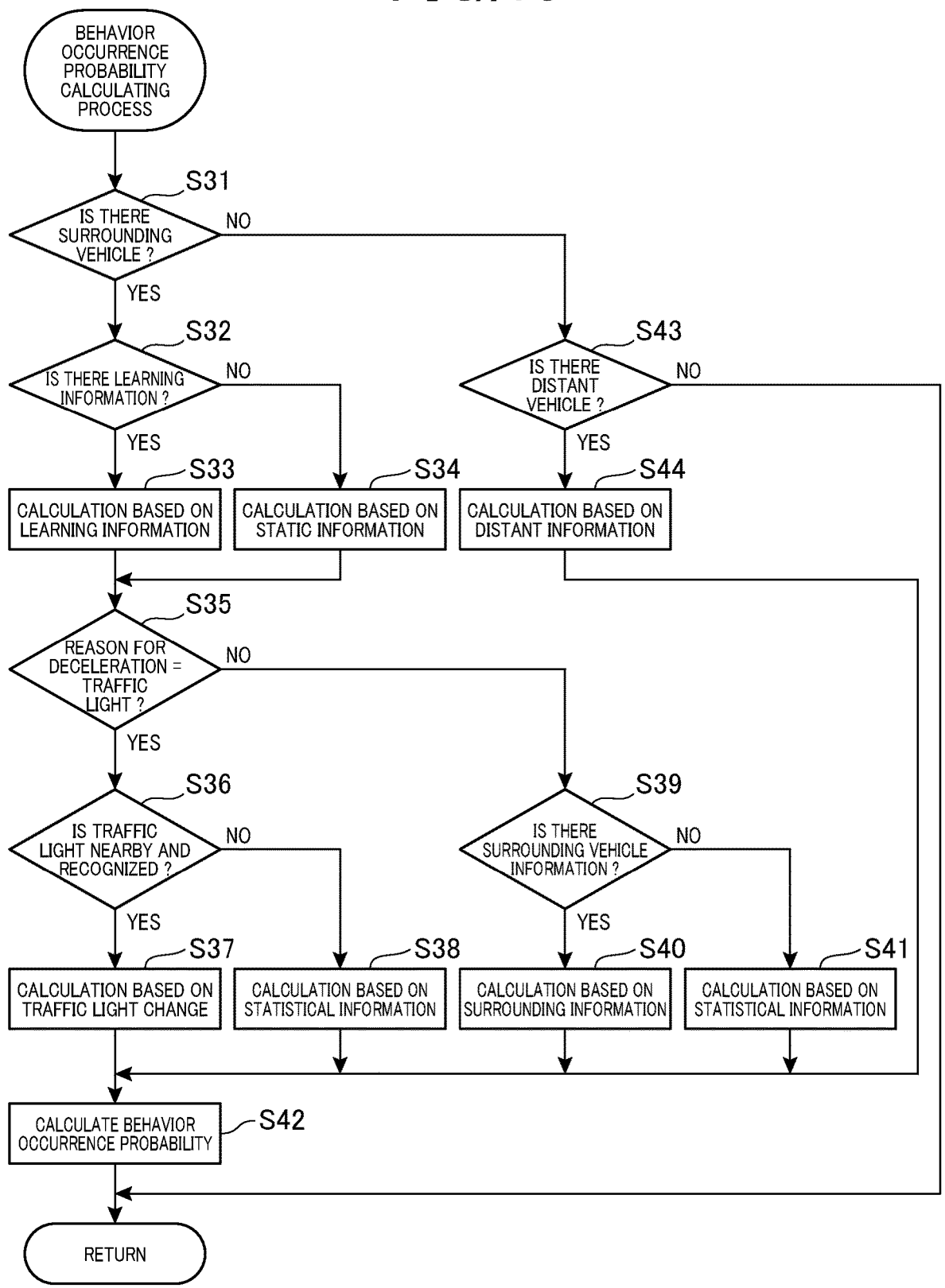
FIG. 16 is a flowchart showing a procedure of a behavior occurrence probability calculating process executed by the prediction ECU in the third embodiment.

As shown in FIG. 16, the prediction ECU 33 first determines in step S31 whether there exists the specific surrounding vehicle.

Specifically, when any object is detected around the own vehicle 10, the perimeter monitoring device 34 recognizes whether the detected object is a surrounding vehicle. At that time, the accuracy of recognition of the specific surrounding vehicle by the perimeter monitoring device 34 varies depending on the situation. For example, the accuracy of the perimeter monitoring device 34 for recognizing an object is lower with an increase in the distance from the own vehicle 10 to the detected object. Thus, it is hard for the perimeter monitoring device 34 to detect accurately whether an object existing far from the own vehicle 10 is the specific surrounding vehicle. Accordingly, when detecting the specific surrounding vehicle, the perimeter monitoring device 34 in the present embodiment calculates the recognition accuracy as well. For example, when detecting an object corresponding to the specific surrounding vehicle, the perimeter monitoring device 34 calculates the recognition accuracy by a map or a calculating equation based on the relative distance of the own vehicle 10 to the object. The map and the calculating equation are set such that, as the distance from the own vehicle 10 to the object is longer, the value of the recognition accuracy becomes smaller. The perimeter monitoring device 34 transmits the calculated recognition accuracy to the prediction ECU 33. The prediction ECU 33 determines that there exists the specific surrounding vehicle based on the condition that the specific surrounding vehicle has been detected by the perimeter monitoring device 34 and the recognition accuracy of the detected specific surrounding vehicle is equal to or higher than a predetermined threshold.

When determining that there exists the specific surrounding vehicle, the prediction ECU 33 makes an affirmative determination in step S31, and then determines in step S32 whether there exists learning information of traveling data of the specific surrounding vehicle.

Specifically, in order to calculate the learning value $p_{lm}$ of the deceleration behavior occurrence probability using the foregoing formula f9, it is necessary that the server device 41 has constructed the deceleration behavior model and the passing behavior model at the traveling spot of the own vehicle 10. In addition, the use of the formula f9 requires the respective likelihoods of the models, and thus the traveling data of the specific surrounding vehicle needs to be accumulated to a degree that the respective likelihoods of the models can be calculated. Thus, the prediction ECU 33 makes an affirmative determination in step S32 based on the condition that the deceleration behavior model and the passing behavior model at the traveling spot of the own vehicle 10 have been acquired from the server device 41 and the traveling data of the specific surrounding vehicle has been accumulated to a degree that the respective likelihoods of the models can be calculated.

About the accumulation of the past traveling data of the surrounding vehicles, the past traveling data of the surrounding vehicles may be accumulated on the server device 41 by transmitting the traveling data such as the vehicle velocity information from the communication unit 36 to the server device 41. Alternatively, the past traveling data of the surrounding vehicles may be accumulated by collecting the traveling histories of the surrounding vehicles in the own vehicle 10.

When making an affirmative determination in step S32, the prediction ECU 33 calculates the learning value $p_{lm}$ of the deceleration behavior occurrence probability based on the past traveling data of the specific surrounding vehicles in step S33. Specifically, the prediction ECU 33 calculates the respective likelihoods of the deceleration behavior model and the passing behavior model based on the past traveling data of the specific surrounding vehicle, and calculates the learning value $p_{lm}$ of the deceleration behavior occurrence probability by the foregoing formula f9 from the difference between the calculated likelihoods of the models.

On the other hand, when the deceleration behavior model and the passing behavior model at the traveling spot of the own vehicle 10 have not been acquired from the server device 41, or when the traveling data of the specific surrounding vehicle has not been accumulated to a degree that the respective likelihoods of the models can be calculated, the prediction ECU 33 makes a negative determination in step S32 shown in FIG. 14. In this case, in step S34, the prediction ECU 33 calculates the learning value $p_{lm}$ of the deceleration behavior occurrence probability based on road static information detected by the perimeter monitoring device 34. The road static information includes the presences or absences of traffic lights, road traveling rules, speed limits, slopes, curved roads, the presences or absences of intersections, and others. For example, when a camera is used as the perimeter monitoring device 34, it is possible to detect road signs, road conditions, and others based on the image data on the surroundings of the vehicle captured by the camera. The prediction ECU 33 acquires the road static information based on the road signs, the road conditions, and others detected by the perimeter monitoring device 34. The prediction ECU 33 has a map in which the deceleration behavior occurrence probability is defined for each item of the road static information. The prediction ECU 33 calculates the deceleration behavior occurrence probability for each item of the acquired road static information, and calculates the learning value $p_{lm}$ of the deceleration behavior occurrence probability using a calculating equation from the calculated deceleration behavior occurrence probability for each item.

After execution of step S33 or S34, the prediction ECU 33 determines in step S35 whether the presence of a traffic signal is a cause for the specific surrounding vehicle's taking a deceleration behavior in the future. For example, the prediction ECU 33 may determine whether the presence of a traffic signal is a cause for the specific surrounding vehicle to take on deceleration behavior in the future based on the past traveling history detected by the perimeter monitoring device 34. Alternatively, when determining that there exists a traffic light installed within a predetermined range from the specific surrounding vehicle based on the road situation detected by the perimeter monitoring device 34, the prediction ECU 33 may determine that the presence of a traffic signal is a cause for the specific surrounding vehicle to take on deceleration behavior in the future.

When determining that the presence of a traffic signal is a cause for the specific surrounding vehicle to take on deceleration behavior in the future, the prediction ECU 33 makes an affirmative determination in step S35, and then determines in step S36 whether there is a traffic light near the current traveling position of the specific surrounding vehicle and the perimeter monitoring device 34 has recognized signal information on the traffic light. When determining that the distance from the specific surrounding vehicle to a traffic light is shorter than a predetermined threshold based on the road situation detected by the perimeter monitoring device 34, the prediction ECU 33 determines that there is a traffic light near the current traveling position of the specific surrounding vehicle. The signal information is information indicating whether the traffic light is lit in blue, yellow, or red. The prediction ECU 33 acquires the signal information of the traffic light by the perimeter monitoring device 34.

When there is a traffic light near the current traveling position of the specific surrounding vehicle and the perimeter monitoring device 34 has recognized the signal information on the traffic light, the prediction ECU 33 makes an affirmative determination in step S36. In this case, the prediction ECU 33 then calculates the predicted value $p_{ftr}$ of the deceleration behavior occurrence probability in accordance with the change timing of the traffic light in step S37.

Specifically, when the own vehicle 10 is traveling, the prediction ECU 33 accumulates the information on the signal change timing of the traffic light based on the signal information of the traffic light detected by the perimeter monitoring device 34. The prediction ECU 33 of the present embodiment accumulates green light duration time information as the information on the signal change timing of the traffic light. The green light duration time information refers to a time necessary for the traffic light to turn from green to yellow since a point in time when the traffic light has turned from red to green, until yellow.

Figure 17:
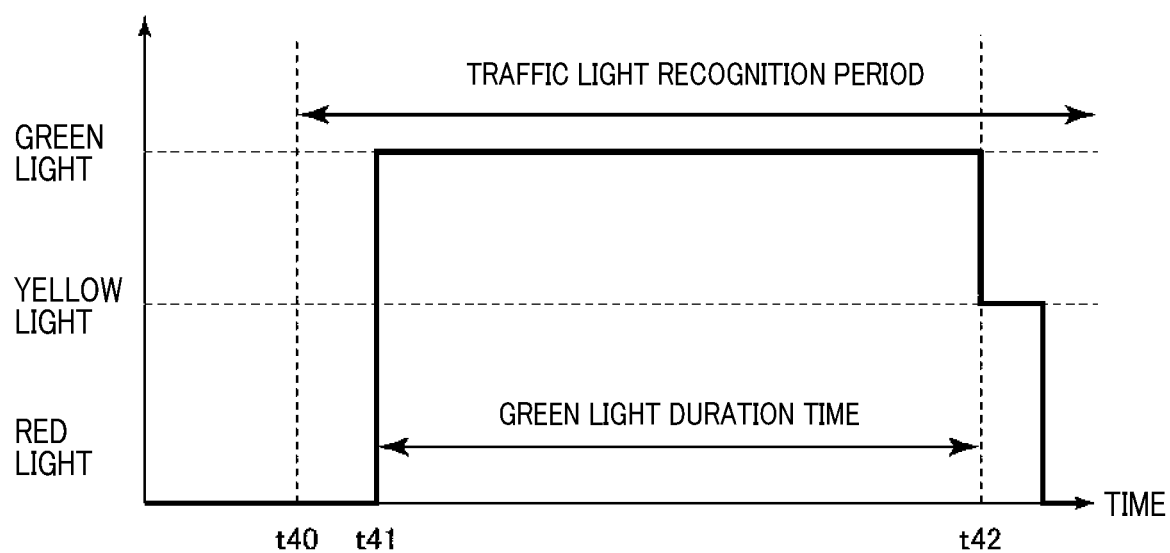
FIG. 17 is a graph showing an example of a method for measuring a green light duration time in the third embodiment.

For example, as shown in FIG. 17, when the traffic light is at red at time t40 when the traffic light is recognized by the perimeter monitoring device 34, the prediction ECU 33 stores, as green light duration time information in the storage device, as a period of time from time t41 when the traffic light subsequently turns to green until time t42 when the traffic light further turns to yellow in the storage device.

Figure 18:
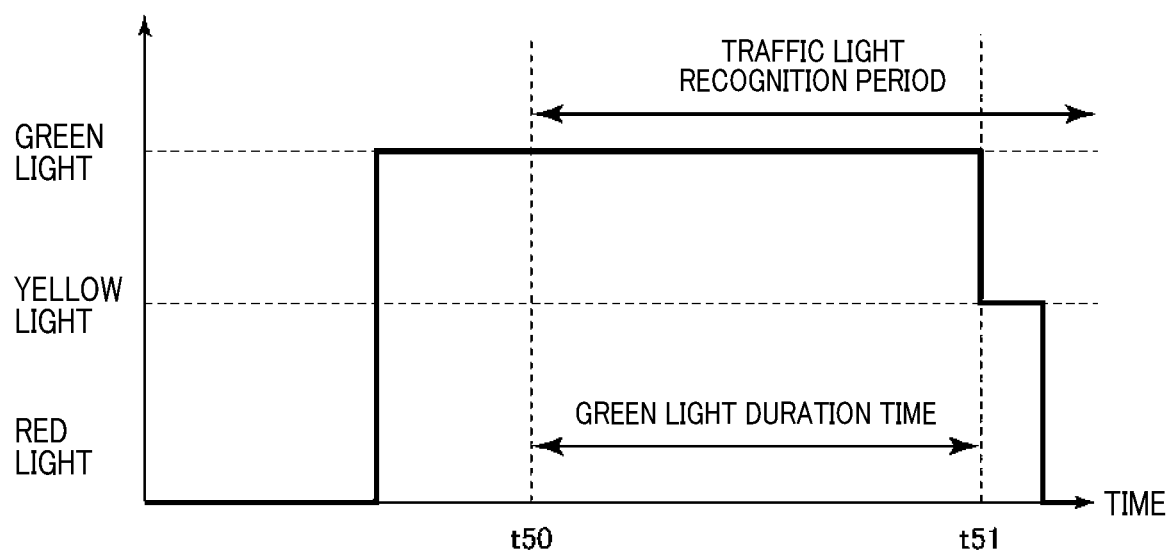
FIG. 18 is a graph showing an example of a method for measuring the green light duration time in the third embodiment.

On the other hand, as illustrated in FIG. 18, for example, when the traffic light is at red at time t50 when the traffic light is recognized by the perimeter monitoring device 34, the prediction ECU 33 stores, as the green light duration time information, a period of time until time t51 when the traffic light subsequently turns to yellow in the storage device.

If there is a traffic light that has a change cycle varying depending on traffic flow, the prediction ECU 33 may learn the green light duration time information in accordance with the information on traffic flow acquired by Vehicle Information and Communication System (VICS, registered trademark) or the like.

Figure 19:
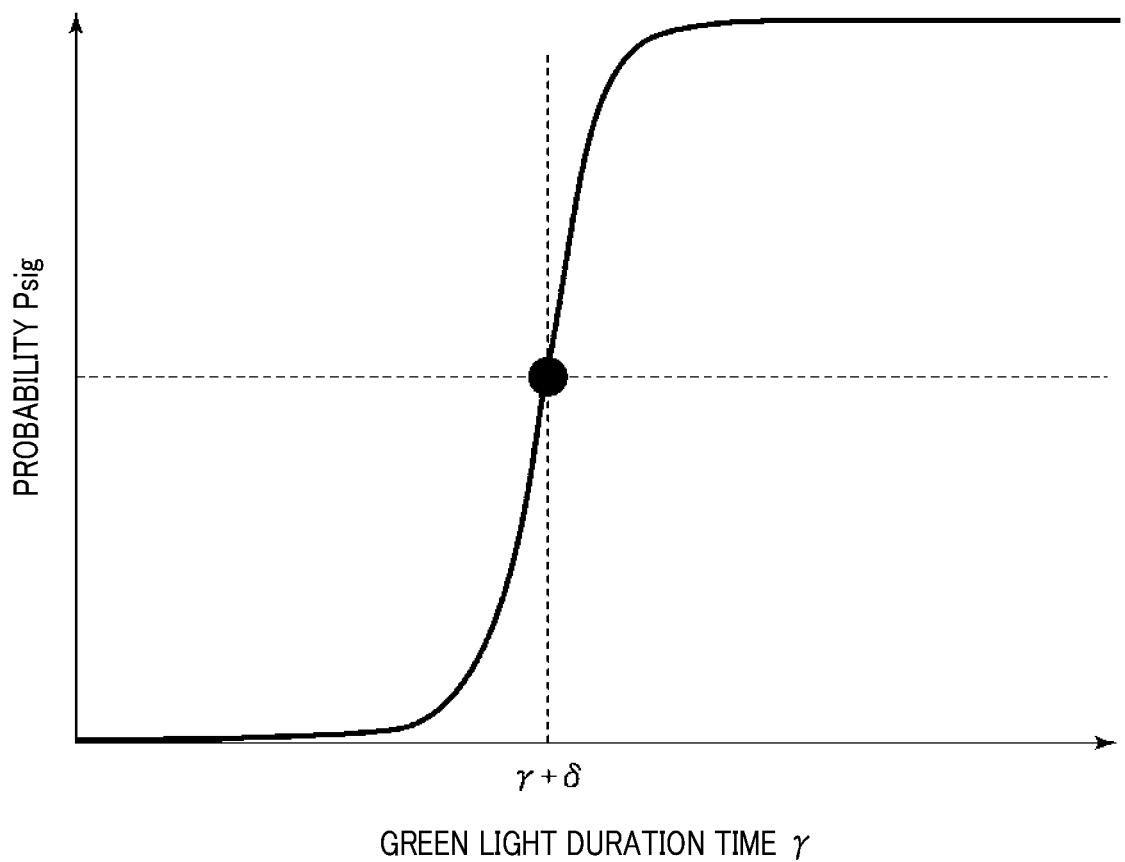
FIG. 19 is a map showing a relationship between a green light duration time γ and probability $p_{sig}$ of a traffic light's turning from green to yellow in the third embodiment.

The prediction ECU 33 creates a map as shown in FIG. 19 based on the green light duration time information accumulated in the storage device. The map shown in FIG. 19 indicates a relationship between green light duration time γ and probability $p_{sig}$ of the traffic light turning from green to yellow such that the green light duration time is placed on the lateral axis and the probability $p_{sig}$ on the vertical axis. This map is stored in the storage device of the prediction ECU 33.

A plurality of vehicles acquires respective green light duration time information and transmits the same to the server device 41 and the server device 41 learns the respective green light duration time information transmitted from the vehicles, thereby the server device 41 may create the map as shown in FIG. 19. In this case, the prediction ECU 33 acquires the map from the server device 41 via the communication unit 36, and thereby may use the map shown in FIG. 19.

If the traffic light is at red at a point in time when the perimeter monitoring device 34 recognizes the traffic light in step S35 or S36 shown in FIG. 16, the prediction ECU 33 measures the green light duration time from a point in time when the traffic light turns from red to green. If the traffic light is at green at a point in time when the perimeter monitoring device 34 recognizes the traffic light in step S35 or S36, the prediction ECU 33 measures the green light duration time from that point in time. With respect to the thus measured green light duration time γ, the probability $p_{sig}$ of the traffic light's turning from green to yellow δ seconds later can be obtained as a value of the probability $p_{sig}$ where the value on the lateral axis is γ+δ in the map as shown in FIG. 19.

On the other hand, when the traffic light near the current traveling position of the specific surrounding vehicle turns from green to yellow, it is presumed that the specific surrounding vehicle will take on deceleration behavior. That is, there is a correlative relationship between the probability $p_{sig}$ of the traffic light's turning from green to yellow and the probability of the specific surrounding vehicle's taking deceleration behavior. Thus, the prediction ECU 33 of the present embodiment uses the probability $p_{sig}$ calculated based on the map shown in FIG. 19 as the predicted value $p_{ftr}$ of the deceleration behavior occurrence probability.

As shown in FIG. 16, when making a negative determination in step S36, that is, when not determining that the traffic light is near the current traveling position of the specific surrounding vehicle, or when determining that the signal information of the traffic light has not been recognized by the perimeter monitoring device 34, the prediction ECU 33 then calculates the predicted value $p_{ftr}$ of the deceleration behavior occurrence probability based on statistic information in step S38.

Specifically, the server device 41 communicates with a plurality of vehicles to acquire information indicating which pattern of behavior, decelerating or passing, the vehicles showed at the traffic light, and calculates the deceleration behavior occurrence probability of the vehicles based on the statistic information. For example, if 50 of 100 vehicles targeted for statistics decelerated at the traffic light and the other 50 passed through the traffic light without deceleration, the server device 41 calculates the deceleration behavior occurrence probability at the traffic light as 0.5. The prediction ECU 33 acquires statistical information Psta of the deceleration behavior occurrence probability at the traffic light from the server device 41, and uses the statistical information Psta of the deceleration behavior occurrence probability as the predicted value $p_{ftr}$ of the deceleration behavior occurrence probability.

As shown FIG. 16, when making a negative determination in step S35, that is, when not determining that there exists signal as a cause for the specific surrounding vehicle to take on deceleration behavior in the future, the prediction ECU 33 then determines in step S39 whether the state amounts of the other surrounding vehicles have been acquired. The state amounts of the other surrounding vehicles include the traveling positions, velocities, and others of the other surrounding vehicles. Specifically, when the state amounts of the other surrounding vehicle have been acquired by the perimeter monitoring device 34, the prediction ECU 33 makes an affirmative determination in step S39. When inter-vehicle communication is allowed between the own vehicle 10 and the other surrounding vehicles, the prediction ECU 33 may make an affirmative determination in step S39 on the condition that the state amounts have been acquired through the communication with the other surrounding vehicles.

When making an affirmative determination in step S39, the prediction ECU 33 calculates the predicted value $p_{ftr}$ of the deceleration behavior occurrence probability based on the state amounts of the other surrounding vehicles in step S40. Specifically, the prediction ECU 33 predicts the respective future behavior of the vehicles by simulation, based on the information of the specific surrounding vehicle such as the current traveling position and velocity and the information of the other surrounding vehicles such as the current traveling positions and velocities. According to this simulation, the prediction ECU 33 calculates a probability $p_{sur}$ that the other surrounding vehicles will take on predetermined behavior that could trigger the deceleration of the specific surrounding vehicle. The predetermined behavior of the other surrounding vehicles that could trigger the deceleration of the specific surrounding vehicle is, for example, the behavior of making a lane change to the lane in which the specific surrounding vehicle is traveling. The prediction ECU 33 uses the calculated occurrence probability $p_{sur}$ of the predetermined behavior of the other surrounding vehicles as the predicted value $p_{ftr}$ of the deceleration behavior occurrence probability.

When making a negative determination in step S39, the prediction ECU 33 then calculates the predicted value $p_{ftr}$ of the deceleration behavior occurrence probability based on statistical information in step S41.

Specifically, the server device 41 communicates with a plurality of vehicles to take statistics on whether the vehicles decelerated at a predetermined place or passed through the predetermined place, and calculates the deceleration behavior occurrence probability of the vehicles based on the statistical information. For example, if 50 of 100 vehicles targeted for statistics decelerated at the predetermined place and the other 50 passed through the predetermined place without deceleration, the server device 41 calculates the deceleration behavior occurrence probability at the traffic light as 0.5. The prediction ECU 33 acquires statistical information Psta of the deceleration behavior occurrence probability corresponding to the current position of the own vehicle from the server device 41, and uses the statistical information Psta of the deceleration behavior occurrence probability as the predicted value $p_{ftr}$ of the deceleration behavior occurrence probability.

When not determining in step S31 that there exists any specific surrounding vehicle of which the recognition accuracy is equal to or higher than a predetermined threshold, the prediction ECU 33 makes a negative determination in step S31. In this case, the prediction ECU 33 then determines in step S43 whether there exists a specific surrounding vehicle corresponding to a distant vehicle. The distant vehicle refers to a vehicle of which the recognition accuracy is lower than a predetermined threshold. When determining that there exists a specific surrounding vehicle corresponding to the distant vehicle, the prediction ECU 33 makes an affirmative determination in step S43, and then calculates the predicted value $p_{ftr}$ of the deceleration behavior occurrence probability based on the information of the distant vehicle in step S44.

For example, the prediction ECU 33 calculates the distance from the own vehicle 10 to the object recognized as the distant vehicle, and calculates an existence probability $p_{far}$ of the object by a calculating equation or the like based on the calculated distance. The calculating equation or the like is set such that, as the distance to an object is longer, the value of the existence probability $p_{far}$ of the object becomes smaller. The prediction ECU 33 uses the calculated existence probability $p_{far}$ of the object as the predicted value $p_{ftr}$ of the deceleration behavior occurrence probability.

After the calculation of the predicted value $p_{ftr}$ of the deceleration behavior occurrence probability in steps S37, S38, S40, S41, and S44, the prediction ECU 33 then calculates the deceleration behavior occurrence probability $p_i$ in step S42. Specifically, the prediction ECU 33 calculates the deceleration behavior occurrence probability $p_i$ using the foregoing formula f10 from the learning value $p_{lm}$ of the deceleration behavior occurrence probability calculated in either step S33 or S34 and the predicted value $p_{ftr}$ of the deceleration behavior occurrence probability calculated in any of steps S37, S38, S40, S41, and S44. In the present embodiment, $P_{lm}^2$ to be used for calculating z can be calculated from the calculating equation $P_{lm}^2=1-P_{lm}$.

On the other hand, when making a negative determination in step S43, that is, when there exists no distant vehicle information, the prediction ECU 33 terminates the series of steps shown in FIG. 4 without executing step S42. In this case, since there is no vehicle around the own vehicle 10 that could cause the own vehicle 10 to take on deceleration behavior, the prediction ECU 33 makes a negative determination in step S13 shown in FIG. 15. Therefore, the ACC ECU 32 transmits to the EV ECU 31 the acceleration command value α that was provisionally set to the first set value α1 in step S11.

According to the vehicle control device 50 of the present embodiment described above, it is possible to obtain the following operations and advantageous effects (11) to (17):

(11) The prediction ECU 33 calculates the deceleration behavior occurrence probability $p_i$ of the specific surrounding vehicle based on the learning information on the learning of behaviors of sampled vehicle in accordance with the traveling data of the vehicle, specifically, based on the vehicle behavior learning models such as the deceleration behavior model and the passing behavior model. The prediction ECU 33 uses the deceleration behavior occurrence probability $p_i$ to determine the calculating equations of the foregoing formulas f2 and f3, and calculates the second set value α2 of the acceleration command value α by determining the state amount b(t) of the own vehicle 10 with which the value of the evaluation function FE1 in the formula f4 becomes minimum. When the prediction ECU 33 determines in step S13 that the own vehicle 10 needs deceleration as shown in FIG. 15, the ACC ECU 32 sets the acceleration command value α to the second set value α2 in step S14. Executing the acceleration control of the own vehicle 10 based on the thus preset acceleration command value α makes it earlier to predict the deceleration behavior of the specific surrounding vehicle and decelerate the own vehicle 10.

(12) The prediction ECU 33 calculates the likelihood as an index for the similarity between the traveling data of the specific surrounding vehicle acquired by the perimeter monitoring device 34 and the vehicle behavior learning models such as the deceleration behavior model and the passing behavior model, and calculates the deceleration behavior occurrence probability $p_i$ of the specific surrounding vehicle based on the likelihood. According to this configuration, it is possible to calculate the deceleration behavior occurrence probability $p_i$ of the specific surrounding vehicle with high accuracy.

(13) When the deceleration behavior occurrence probability $p_i$ cannot be calculated using the learning models such as the deceleration behavior model and the passing behavior model, the prediction ECU 33 calculates the deceleration behavior occurrence probability $p_i$ based on road static information. According to this configuration, it is possible to calculate the deceleration behavior occurrence probability $p_i$ even in a situation where the vehicle behavior learning models cannot be used.

(14) When the recognition accuracy of the specific surrounding vehicle recognized by the perimeter monitoring device 34 is lower than a predetermined threshold, the prediction ECU 33 corrects the deceleration behavior occurrence probability $p_i$ based on the existence probability indicating the possibility that there actually exists an object recognized as a specific surrounding vehicle. According to this configuration, it is possible to calculate the deceleration behavior occurrence probability $p_i$ with higher accuracy in accordance with the recognition accuracy of the perimeter monitoring device 34.

(15) The prediction ECU 33 corrects the deceleration behavior occurrence probability $p_i$ based on the occurrence probability of the traffic light's changing. According to this configuration, it is possible to calculate the deceleration behavior occurrence probability $p_i$ with higher accuracy in accordance with the situation of change of the traffic light.

(16) The prediction ECU 33 corrects the deceleration behavior occurrence probability $p_i$ of the surrounding vehicles based on the statistical information of the deceleration occurrence probability of sampled vehicles. According to this configuration, it is possible to calculate the deceleration behavior occurrence probability $p_i$ with higher accuracy in accordance with the statistical information.

(17) The prediction ECU 33 acquires the traveling data of the surrounding vehicles through communication between the own vehicle 10 and the surrounding vehicles. According to this configuration, it is possible to acquire the traveling data of the surrounding vehicles with higher accuracy.

Other Embodiments

The foregoing embodiments can also be carried out in the modes described below.

The vehicle 10 of the second embodiment may not have the motor generator 20, the inverter device 21, the battery 22, and the MG ECU 30. That is, the vehicle 10 of the second embodiment may use only the engine 60 as motive power for traveling.

The prediction ECU 33 of the third embodiment uses the deceleration behavior model and the passing behavior model as the behavior learning models of the surrounding vehicles. Alternatively, the prediction ECU 33 may use other learning models. For example, as the deceleration behavior models, the prediction ECU 33 may use a first deceleration behavior model based on the premise that the vehicle will stop and a second deceleration behavior model not based on the premise that the vehicle will stop.

In the vehicle control device 50 of the third embodiment, the vehicle behavior learning models may be constructed by the prediction ECU 33 instead of the server device 41.

The prediction ECU 33 of the third embodiment may predict, as behavior of the surrounding vehicles, not only the deceleration behavior of the surrounding vehicles but also arbitrary behavior of the surrounding vehicles. Along with this, the server device 41 or the prediction ECU 33 may learn the arbitrary behavior of the vehicles.

Figure 12:
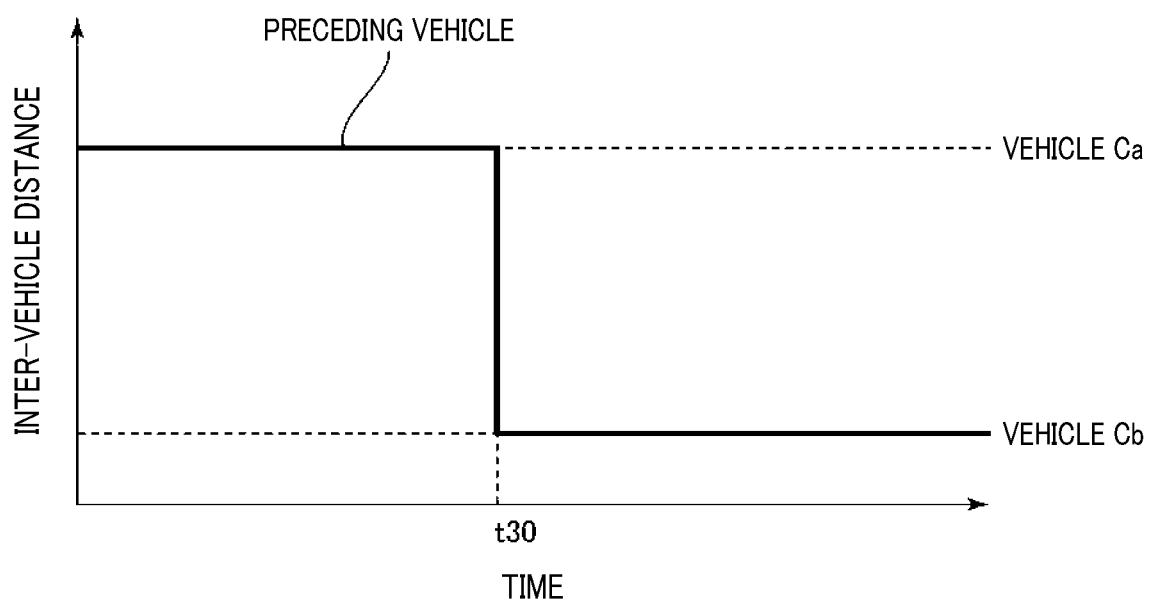
FIG. 12 is a time chart showing a preceding vehicle switching procedure executed by a prediction ECU in another embodiment.

The prediction ECU 33 may predict cut-in by a vehicle from an adjacent lane as an adverse-effect change has occurred in a surrounding environment around the own vehicle, the adverse-effect change being likely to have an adverse effect on a fuel economy of the own vehicle 10. Specifically, when a vehicle Cb cuts into between the own vehicle 10 and a vehicle Ca traveling in front of the own vehicle, the prediction ECU 33 uses the state amount of the vehicle Ca as the state amount of the preceding vehicle before the cut-in as shown by a solid line in FIG. 12, and when the vehicle Cb has cut into the lane at time t30, the prediction ECU 33 uses the state amount of the vehicle Cb as the state amount of the preceding vehicle since then.

As the state amount b(t), a function including information such as the velocity and position of the vehicle 10 may be used.

The ACC ECU 32 may transmit a velocity command value specifying the velocity of the vehicle 10, instead of the acceleration command value α, to the EV ECU 31 and the HV ECU 39.

To calculate the following performance evaluation value of the own vehicle 10, the prediction ECU 33 may use respective velocity information of the i-th preceding vehicle and the own vehicle 10, instead of the respective positional information of these vehicles. For example, the prediction ECU 33 defines the ideal traveling range within a minimum velocity $V_{min}$ to a maximum velocity $V_{max}$, and expresses a future deviation amount $z_i$ of the predicted velocity of the own vehicle 10 from the ideal traveling range by the following formula (11):

[Math. 10]

$$z_i = \begin{cases} V_{min} - V & (V < V_{min}) \\ V - V_{max} & (V > V_{max}) \end{cases} \quad (f11)$$

Then, the prediction ECU 33 may use a value obtained by integrating the deviation amount $z_i$ by a range from the present to a prediction time T as the following performance evaluation value of the own vehicle 10.

The perimeter monitoring device 34 may acquire information on pedestrians walking in and around roads, traffic lights, road traveling rules, speed limits, slopes, curves, intersections, and others. In this case, the prediction ECU 33 may determine whether the vehicle 10 needs deceleration based on the information acquired by the perimeter monitoring device 34.

The prediction ECU 33 may use a predicted value of fuel economy as an index for fuel economy of the own vehicle 10. Specifically, the prediction ECU 33 accumulates fuel economy data and calculates the predicted value of the fuel economy based on the accumulated past fuel economy data.

The acceleration of the vehicle 10 may be limited by not only a method by which to change the acceleration command value α but also a method for issuing a command by which to result in a change in the acceleration, for example, a method by which to limit the drive torque or power of the vehicle 10. The limitation of the drive torque or power of the vehicle 10 refers to not the output limitation for protection of the motor generator 20 and the battery 22 but the limitation of the output in the control regardless of the maximum output of the components.

To control the traveling of the vehicle 10 by the ACC control or the CC control, the ACC ECU 32 may adopt a method by which to use a velocity control to control the velocity of the own vehicle 10, instead of a method by which to use an acceleration control to control the acceleration of the own vehicle 10. The ACC ECU 32 can use an instruction control to instruct the occupant of the own vehicle 10 for the driving method as in the modification example of the first embodiment.

The means and/or functions performed by the vehicle control device 50 can be provided by software stored in a tangible storage device and a calculator executing the software, software alone, hardware alone, or a combination of them. For example, when the vehicle control device 50 is provided as an electronic circuit that is hardware, the vehicle control device 50 can be a digital circuit or an analog circuit including many logic circuits.

The present disclosure is not limited to the specific examples described above. The specific examples to which persons skilled in the art make design changes as appropriate are also included in the scope of the present disclosure as far as they include the features of the present disclosure. The components and their arrangements, conditions, and shapes of the specific examples are not limited to the ones exemplified above but can be changed as appropriate. The components included in the specific examples described above can be changed in combination as appropriate without causing any technical conflict.

What is claimed is:

1. A vehicle control device that executes a traveling control that controls traveling of an own vehicle to control acceleration and deceleration of the own vehicle so that the own vehicle follows a preceding vehicle traveling in front of the own vehicle, the traveling control being configured to control deceleration of the own vehicle at a first deceleration rate settable by the traveling control, the vehicle control device comprising:

an environment prediction unit configured to:
   predict whether an adverse-effect change will occur in a surrounding environment around the own vehicle, the adverse-effect change having an adverse effect on a fuel economy of the own vehicle; and
   predict whether the adverse-effect change will occur in the surrounding environment based on a first index for the fuel economy of the own vehicle and a second index for following performance of the own vehicle to the preceding vehicle; and an acceleration control unit configured to:
   execute a prediction control that enables the acceleration of the own vehicle to be limited when the environment prediction unit predicts that the adverse-effect change will occur in the surrounding environment;
   predict that the adverse-effect change will occur in the surrounding environment around the own vehicle when the environment prediction unit predicts that, as the adverse-effect change, a deceleration requirement change will occur in the surrounding environment, the deceleration requirement change being required for delectation of the own vehicle; and
   execute, as the prediction control, a deceleration control that decelerates the own vehicle at a predetermined second deceleration rate when the environment prediction unit predicts that the adverse-effect change will occur in the surrounding environment, the second deceleration rate being lower than the first deceleration rate, wherein the first index for the fuel economy of the own vehicle includes a predicted value of braking energy or a predicted value of the fuel economy, the predicted value of the braking energy representing a value of the braking energy that is predicted to be generated based on deceleration of the own vehicle by the traveling control during a first predetermined period from a present time to a predetermined first future time, the second index for the following performance of the vehicle includes one of:
   a sum of deviations in position of the own vehicle from an ideal traveling that is based on the traveling control during a second predetermined period from the present time to a predetermined second future time, and a sum of deviations in velocity of the own vehicle from the ideal traveling that is based on the traveling control during the second predetermined period from the present time to the predetermined second future time.

2. The vehicle control device according to claim 1, wherein the traveling control is a burn-and-coast control to cause the own vehicle to follow the preceding vehicle by repeatedly accelerating and decelerating the own vehicle.

3. The vehicle control device according to claim 1, wherein the environment prediction unit is configured to predict, as the adverse-effect change, at least one of
deceleration of the preceding vehicle, and
cut-in of a vehicle from an adjacent lane.

4. The vehicle control device according to claim 1, wherein the traveling control is any one of a velocity control to control a velocity of the own vehicle, an acceleration control to control the acceleration of the own vehicle, and an instruction control to instruct an occupant of the own vehicle on a driving method.

5. The vehicle control device according to claim 1, wherein the acceleration control unit executes, as the prediction control, an acceleration control to actually limit the acceleration of the own vehicle or an instruction control to instruct an occupant of the own vehicle on a driving method such that the acceleration of the own vehicle is limited.

6. A vehicle control device that executes a traveling control that controls traveling of an own vehicle to enable the own vehicle to follow a preceding vehicle traveling in front of the own vehicle, the vehicle control device comprising:

an environment prediction unit that predicts whether an adverse-effect change will occur in a surrounding environment around the own vehicle, the adverse-effect change having an adverse effect on a fuel economy of the own vehicle;

an acceleration control unit configured to execute a prediction control that enables an acceleration of the own vehicle to be limited when the environment prediction unit predicts that the adverse-effect change will occur in the surrounding environment; and a traveling control unit that:
controls driving and stopping of an engine of the own vehicle based on a traveling state of the own vehicle, and
restarts the engine based on the acceleration of the own vehicle when the engine of the own vehicle is stopped while the own vehicle is in motion, wherein
as the prediction control, the acceleration control unit sends a lowered acceleration command value to the traveling control unit, to limit the acceleration of the own vehicle and thereby cause restarting of the engine to be less likely to be carried out by the traveling control unit, wherein the environment prediction unit determines whether to limit the acceleration of the own vehicle based on a first index for the fuel economy of the own vehicle, and the first index for the fuel economy of the own vehicle includes a predicted value of a ratio of output energy of a power train to input energy of the power train of the own vehicle during a predetermined first period from a present time to a predetermined first future time or a predicted value of the fuel economy.

7. The vehicle control device according to claim 6, wherein the environment prediction unit determines whether to limit the acceleration of the own vehicle based on a second index for the following performance of the own vehicle to the preceding vehicle.

8. The vehicle control device according to claim 7, wherein
the second index for the following performance of the vehicle includes one of
a sum of deviations in position of the own vehicle from an ideal traveling that is based on the traveling control during a second predetermined period from the present time to a predetermined second future time, and
a sum of deviations in velocity of the own vehicle from the ideal traveling that is based on the traveling control during the second predetermined period from the present time to the predetermined second future time.

9. The vehicle control device according to claim 8, wherein the predicted value of the ratio of the output energy of the power train to the input energy of the power train of the own vehicle includes a predicted value of a ratio of output energy of the engine to input energy of the engine and a predicted value of the ratio of the output energy of the power train to the input energy of the power train of the own vehicle in a state where the engine is stopped.

10. The vehicle control device according to claim 7, wherein
the environment prediction unit calculates an expected value of the first index for the fuel economy of the own vehicle based on an occurrence probability of a behavior of a surrounding vehicle and a value of the first index for the fuel economy of the own vehicle to the behavior of the surrounding vehicle,
the environment prediction unit calculates an expected value of the second index for the following performance of the own vehicle based on the occurrence probability of the behavior of the surrounding vehicle and a value of the second index for the following performance of the own vehicle to the behavior of the surrounding vehicle, and
the environment prediction unit calculates a value of an evaluation function that includes-the expected value of the first index for the fuel economy of the own vehicle and the expected value of the second index for the following performance of the own vehicle, and predicts the adverse-effect change will occur in the surrounding environment based on the value of the evaluation function.

11. The vehicle control device according to claim 10, wherein the environment prediction unit calculates the occurrence probability of the behavior of the surrounding vehicle based on learning information on learning of behaviors of sampled vehicles based on traveling data of the sampled vehicles.

12. The vehicle control device according to claim 11, further comprising a perimeter monitoring unit that acquires traveling data of the surrounding vehicle traveling around the own vehicle, wherein
the environment prediction unit calculates a likelihood that is an index indicating similarity between the traveling data of the surrounding vehicle acquired by the perimeter monitoring unit and the learning information, and calculates the occurrence probability of the behavior of the surrounding vehicle based on the likelihood.

13. The vehicle control device according to claim 12, wherein
the perimeter monitoring unit further acquires road static information, and
when the learning information is unavailable, the environment prediction unit calculates the occurrence probability of the behavior of the surrounding vehicle based on the road static information.

14. The vehicle control device according to claim 12, wherein, when a value of recognition accuracy of the surrounding vehicle by the perimeter monitoring unit is lower than a predetermined threshold, the environment prediction unit corrects the occurrence probability of the behavior of the surrounding vehicle based on an existence probability that indicates a possibility of actual existence of an object recognized as the surrounding vehicle.

15. The vehicle control device according to claim 12, wherein
the perimeter monitoring unit further acquires information on change timing of a traffic light installed on a road, and
the environment prediction unit corrects the occurrence probability of the behavior of the surrounding vehicle based on an occurrence probability of change of the traffic light.

16. The vehicle control device according to claim 12, wherein the environment prediction unit corrects the occurrence probability of the behavior of the surrounding vehicle based on statistical information on occurrence probabilities of behaviors of respective sampled vehicles.

17. The vehicle control device according to claim 12, wherein the environment prediction unit acquires the traveling data of the surrounding vehicle through communication between the own vehicle and the surrounding vehicle.

18. The vehicle control device according to claim 6, wherein the traveling control is a burn-and-coast control to cause the own vehicle to follow the preceding vehicle by repeatedly accelerating and decelerating the own vehicle.

19. The vehicle control device according to claim 6, wherein the environment prediction unit is configured to predict, as the adverse-effect change, at least one of
deceleration of the preceding vehicle, and
cut-in of a vehicle from an adjacent lane.

20. The vehicle control device according to claim 6, wherein the traveling control is any one of a velocity control to control a velocity of the own vehicle, an acceleration control to control the acceleration of the own vehicle, and an instruction control to instruct an occupant of the own vehicle on a driving method.

21. The vehicle control device according to claim 6, wherein the acceleration control unit executes, as the prediction control, an acceleration control to actually limit the acceleration of the own vehicle or an instruction control to instruct an occupant of the own vehicle on a driving method such that the acceleration of the own vehicle is limited.

* * * * *